United States Patent
Zhang et al.

(10) Patent No.: US 12,547,208 B2
(45) Date of Patent: Feb. 10, 2026

(54) FOLDABLE DISPLAY DEVICE AND DRIVING METHOD THEREFOR

(71) Applicants: Chengdu BOE Optoelectronics Technology Co., Ltd., Sichuan (CN); BOE Technology Group Co., Ltd., Beijing (CN)

(72) Inventors: Jiaqin Zhang, Beijing (CN); Chang Zhang, Beijing (CN); Yong Yu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 258 days.

(21) Appl. No.: 17/795,241

(22) PCT Filed: Aug. 10, 2021

(86) PCT No.: PCT/CN2021/111730
§ 371 (c)(1),
(2) Date: Jul. 26, 2022

(87) PCT Pub. No.: WO2023/015435
PCT Pub. Date: Feb. 16, 2023

(65) Prior Publication Data
US 2024/0184327 A1      Jun. 6, 2024

(51) Int. Cl.
*G06F 1/16* (2006.01)
*G06F 1/18* (2006.01)

(52) U.S. Cl.
CPC .......... *G06F 1/1616* (2013.01); *G06F 1/1677* (2013.01); *G06F 1/181* (2013.01); *G06F 1/183* (2013.01)

(58) Field of Classification Search
None
See application file for complete search history.

(56) References Cited

U.S. PATENT DOCUMENTS

2016/0378252 A1\* 12/2016  Jeong ............ G06F 3/0446
                                                            345/174
2018/0122863 A1    5/2018  Bok
(Continued)

FOREIGN PATENT DOCUMENTS

CN        107393468 A    11/2017
CN        109786430 A    5/2019
(Continued)

*Primary Examiner* — Benjamin C Lee
*Assistant Examiner* — Emily J Frank
(74) *Attorney, Agent, or Firm* — Ling Wu; Stephen Yang; Ling and Yang Intellectual Property

(57) ABSTRACT

A foldable display device and a method for driving the same are provided. The foldable display device comprises a display panel, at least one capacitive sensor and at least one detection circuit, wherein the display panel comprises at least one bending area configured for bending, the capacitive sensor comprises a first electrode structure and a second electrode structure configured to form a sensing capacitor, and the detection circuit is connected to the first electrode structure and the second electrode structure, respectively, and is configured to detect a capacitance value of the sensing capacitor and obtain a bending angle of the foldable display device according to the capacitance value or a capacitance change amount of the sensing capacitor.

20 Claims, 9 Drawing Sheets

(56) References Cited

U.S. PATENT DOCUMENTS

| | | | |
|---|---|---|---|
| 2019/0066564 A1 | 2/2019 | Tan | |
| 2021/0043701 A1* | 2/2021 | Li | H10K 59/1216 |
| 2021/0227709 A1* | 7/2021 | Sim | H05K 5/03 |
| 2021/0360099 A1* | 11/2021 | You | H03K 17/964 |
| 2022/0392927 A1* | 12/2022 | Hu | G02B 1/11 |
| 2023/0004206 A1* | 1/2023 | Vandermeijden | G06F 1/3231 |
| 2023/0046687 A1* | 2/2023 | Liu | G06F 1/1677 |
| 2023/0156934 A1* | 5/2023 | Jiang | G06F 1/1681 |
| | | | 361/807 |
| 2023/0262158 A1* | 8/2023 | Yu | G06F 1/1652 |
| | | | 455/575.4 |
| 2024/0134480 A1* | 4/2024 | Zhou | G06F 3/0418 |

FOREIGN PATENT DOCUMENTS

| | | | |
|---|---|---|---|
| CN | 110109513 A | 8/2019 | |
| CN | 110491921 A | 11/2019 | |
| CN | 110689811 A | 1/2020 | |
| CN | 112436046 A | 3/2021 | |
| KR | 10-2017-0047057 A | 5/2017 | |

* cited by examiner

FOLDABLE DISPLAY DEVICE AND DRIVING METHOD THEREFOR

CROSS-REFERENCE TO RELATED APPLICATION

The present application is a U.S. National Phase Entry of International Application No. PCT/CN2021/111730 having an international filing date of Aug. 10, 2021, the entire content of which is hereby incorporated by reference.

TECHNICAL FIELD

The present disclosure relates to, but is not limited to, the field of display technologies, in particular to a foldable display device and a method for driving the foldable display device.

BACKGROUND

An Organic Light Emitting Diode (OLED for short) and a Quantum dot Light Emitting Diode (QLED for short) are active light emitting display devices and have advantages of self-luminescence, a wide viewing angle, a high contrast ratio, low power consumption, an extremely high response speed, lightness and thinness, flexibility, and a low cost, etc. With constant development of display technologies, a flexible display that uses an OLED or a QLED as a light emitting device and performs signal control by a Thin Film Transistor (TFT for short) has become a mainstream product in the field of display at present.

SUMMARY

The following is a summary of subject matters described herein in detail. The summary is not intended to limit the protection scope of claims.

In one aspect, the present disclosure provides a foldable display device, including a display panel, at least one capacitive sensor and at least one detection circuit, wherein the display panel includes at least one bending area configured for bending, the capacitive sensor includes a first electrode structure and a second electrode structure configured to form a sensing capacitor, and the detection circuit is connected to the first electrode structure and the second electrode structure, respectively, and is configured to detect a capacitance value of the sensing capacitor and obtain a bending angle of the foldable display device according to the capacitance value or a capacitance change amount of the sensing capacitor.

In an exemplary embodiment, the display panel further includes a first unfolded area and a second unfolded area provided on two sides of the bending area, respectively, the first electrode structure is connected to the first unfolded area, and the second electrode structure is connected to the second unfolded area.

In an exemplary embodiment, the foldable display device includes a reinforcing layer and a display structure layer provided on the reinforcing layer, wherein the display structure layer is provided with at least one mounting groove, the mounting groove at least includes a groove bottom surface exposing the reinforcing layer, a first groove wall located in the first unfolded area and a second groove wall located in the second unfolded area, the capacitive sensor is provided in the mounting groove, the first electrode structure is connected to the first groove wall and/or the groove bottom surface, and the second electrode structure is connected to the second groove wall and/or the groove bottom surface.

In an exemplary embodiment, the first electrode structure includes a first fixing structure connected to the first groove wall and/or the groove bottom surface of the mounting groove and a first electrode provided on a side of the first fixing structure close to the reinforcing layer; and the second electrode structure includes a second fixing structure connected to the second groove wall and/or the groove bottom surface of the mounting groove and a second electrode provided on a side of the second fixing structure away from the reinforcing layer.

In an exemplary embodiment, the first fixing structure includes a first bottom frame and a first side frame, wherein the first bottom frame is in a strip shape extending in a first direction, the first side frame is in a strip shape extending in a second direction, the first side frame is connected to an end of the first bottom frame far away from the bending area, and the second direction intersects with the first direction; the first side frame is connected to the first groove wall and/or the groove bottom surface of the mounting groove, and the first electrode is provided on a side of the first bottom frame close to the reinforcing layer; the second fixing structure includes a second bottom frame and a second side frame, wherein the second bottom frame is in a strip shape extending in the first direction, the second side frame is in a strip shape extending in the second direction, and the second side frame is connected to an end of the second bottom frame far away from the bending area; the second electrode is provided on a side of the second bottom frame far away from the reinforcing layer, the second side frame is connected to the second groove wall of the mounting groove, and/or the second bottom frame is connected to the groove bottom surface of the mounting groove.

In an exemplary embodiment, the first fixing structure includes a first side, a second side, a third side and a fourth side that are connected in turn and form an annular chamber, the first side and the third side extending in a first direction, the second side and the fourth side extending in a second direction, the second direction intersecting with the first direction; the third side is connected to the groove bottom surface of the mounting groove, and/or the fourth side is connected to the first groove wall of the mounting groove; the first electrode is provided on a side of the first side facing the reinforcing layer, and the second side is provided with at least one opening; the second fixing structure is a strip-shaped supporting layer extending in the first direction, which is connected to the groove bottom surface of the mounting groove, and/or connected to the second groove wall of the mounting groove; a first portion of the second electrode close to the first unfolded area extends through the opening into the annular chamber of the first fixing structure such that an orthographic projection of the first electrode on a plane of the foldable display device overlaps at least partially with an orthographic projection of the second electrode on a plane of the foldable display device; a second portion of the second electrode away from the first unfolded area is provided on a side of the strip-shaped support layer away from the reinforcing layer.

In an exemplary embodiment, a side of the third side away from the reinforcing layer is provided with at least one support table configured to support the second electrode extending into the annular chamber.

In an exemplary embodiment, the foldable display device further includes a connector, a first housing and a second housing provided on two sides of the connector, respectively; the display panel further includes a first unfolded area and a second unfolded area provided on two sides of the bending area, respectively, wherein the first unfolded area is connected to the first housing, the second unfolded area is connected to the second housing, and the first electrode structure and the second electrode structure are provided on the connector.

In an exemplary embodiment, the connector includes a rotating shaft, and a first connector, a second connector, a first electrode structure and a second electrode structure respectively sheathed on the rotating shaft; the first connector includes a first cylinder sheathed on the rotating shaft and a first connecting piece provided on the first cylinder, the first connecting piece is connected to the first housing; the second connector includes a second cylinder sheathed on the rotating shaft and a second connecting piece provided on the second cylinder, and the second connecting piece is connected to the second housing; the first electrode structure includes a third cylinder sheathed on the rotating shaft and a third electrode provided on the third cylinder, the third cylinder is connected to the first cylinder; the second electrode structure includes a fourth cylinder sheathed on the rotating shaft and a fourth electrode provided on the fourth cylinder, the fourth cylinder is connected to the second cylinder; an orthographic projection of the third electrode on a plane perpendicular to the rotating shaft overlaps at least partially with an orthographic projection of the fourth electrode on a plane perpendicular to the rotating shaft.

In an exemplary embodiment, the detection circuit includes an input module, a compensation output module, a reset module and a processing module, wherein the input module is respectively connected to a first power supply line, a first signal line and a first node, wherein the first node is connected to a first electrode of the first electrode structure; the input module is configured to output a high-level voltage signal of the first power supply line to the first node under control of the first signal line to charge the sensing capacitor;

the compensation output module is respectively connected to a second signal line, a third signal line, a first node, a second node and a processing module, wherein the second node is connected to a second power supply line and a second electrode of the second electrode structure; the compensation output module is configured to compensate a base noise of the detection circuit under control of the second signal line, and outputs a voltage of the first node to the processing module under control of the second signal line and the third signal line;

the reset module is respectively connected to a fourth signal line, the second power supply line, the first node and the second node, and is configured to output a voltage of the second node to the first node under control of the fourth signal line to initialize and reset the sensing capacitor; and the processing module is connected to the compensation output module, and is configured to receive and process a signal output by the compensation output module, and output a data signal proportional to the capacitance value of the sensing capacitor.

In an exemplary embodiment, the input module includes a first switch, wherein a control electrode of the first switch is connected to the first signal line, a first electrode of the first switch is connected to the first power supply line, and a second electrode of the first switch is connected to the first node.

In an exemplary embodiment, the compensation output module includes a second switch, a third switch and a compensation capacitor, wherein a control electrode of the second switch is connected to the second signal line, a first electrode of the second switch is connected to the first node, a second electrode of the second switch is connected to a first electrode plate of the compensation capacitor, a second electrode plate of the compensation capacitor is connected to the second node, a control electrode of the third switch is connected to the third signal line, a first electrode of the third switch is connected to the first node, and a second electrode of the third switch is connected to the processing module.

In an exemplary embodiment, the reset module includes a fourth switch, wherein a control electrode of the fourth switch is connected to the fourth signal line, a first electrode of the fourth switch is connected to the second node, and a second electrode of the fourth switch is connected to the first node.

In an exemplary embodiment, the processing module includes an integrating amplifier, an analog-to-digital converter and a feedback capacitor, wherein the feedback capacitor is provided between a negative input terminal of the integrating amplifier and an output terminal of the integrating amplifier, a positive input terminal of the integrating amplifier is connected to a reference voltage line, the negative input terminal of the integrating amplifier is connected to the compensation output module, the output terminal of the integrating amplifier is connected to an input terminal of the analog-to-digital converter, and an output terminal of the analog-to-digital converter outputs a data signal proportional to a capacitance value of the sensing capacitor.

In an exemplary embodiment, the input module includes a first switch, the compensation output module includes a second switch, a third switch, and a compensation capacitor, the reset module includes a fourth switch, and the processing module includes an integrating amplifier, an analog-to-digital converter, and a feedback capacitor;

a control electrode of the first switch is connected to the first signal line, a first electrode of the first switch is connected to the first power supply line, and a second electrode of the first switch is connected to the first node;

a control electrode of the second switch is connected to the second signal line, a first electrode of the second switch is connected to the first node, a second electrode of the second switch is connected to a first electrode plate of the compensation capacitor, and a second electrode plate of the compensation capacitor is connected to the second node;

a control electrode of the third switch is connected to the third signal line, a first electrode of the third switch is connected to the first node, and a second electrode of the third switch is connected to the processing module;

a control electrode of the fourth switch is connected to the fourth signal line, a first electrode of the fourth switch is connected to the second node, and a second electrode of the fourth switch is connected to the first node;

the feedback capacitor is provided between a negative input terminal of the integrating amplifier and an output terminal of the integrating amplifier; and a positive input terminal of the integrating amplifier is connected to a reference voltage line, the negative input terminal of the integrating amplifier is connected to the compensation output module, the output terminal of the integrating amplifier is connected to an input terminal of the analog-to-digital converter, and an output terminal of the analog-to-digital converter outputs a data signal proportional to a capacitance value of the sensing capacitor.

On the other hand, the present disclosure further provides a method for driving the aforementioned foldable display device, including:

acquiring a folding angle of a foldable display device; and subjecting a folding area to color deviation correction according to the folding angle.

In an exemplary embodiment, acquiring the folding angle of the foldable display device includes:

acquiring and storing an initial data signal output by a detection circuit when the foldable display device is in an unbent state;

acquiring a bending data signal output by the detection circuit when the foldable display device is in a bent state; and acquiring a bending angle of the foldable display device according to the initial data signal and the bending data signal.

In an exemplary embodiment, acquiring the bending angle of the foldable display device according to the initial data signal and the bending data signal includes:

calculating a difference value between the initial data signal and the bending data signal; and acquiring the bending angle of the foldable display device according to the difference value and a preset bending angle coefficient.

In an exemplary embodiment, the bending angle coefficient is acquired by a calibration process, and the calibration process includes:

preparing the foldable display device;

placing the foldable display device in a completely flattened state, and acquiring the initial data signal output by the detection circuit;

placing the foldable display device in a fully folded state, and acquiring a folding data signal output by the detection circuit; and acquiring the bending angle coefficient according to the initial data signal and the folding data signal.

Other aspects may be understood upon reading and understanding the drawings and the detailed description.

BRIEF DESCRIPTION OF DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DESCRIPTION OF REFERENCE SIGNS

Figure 1:
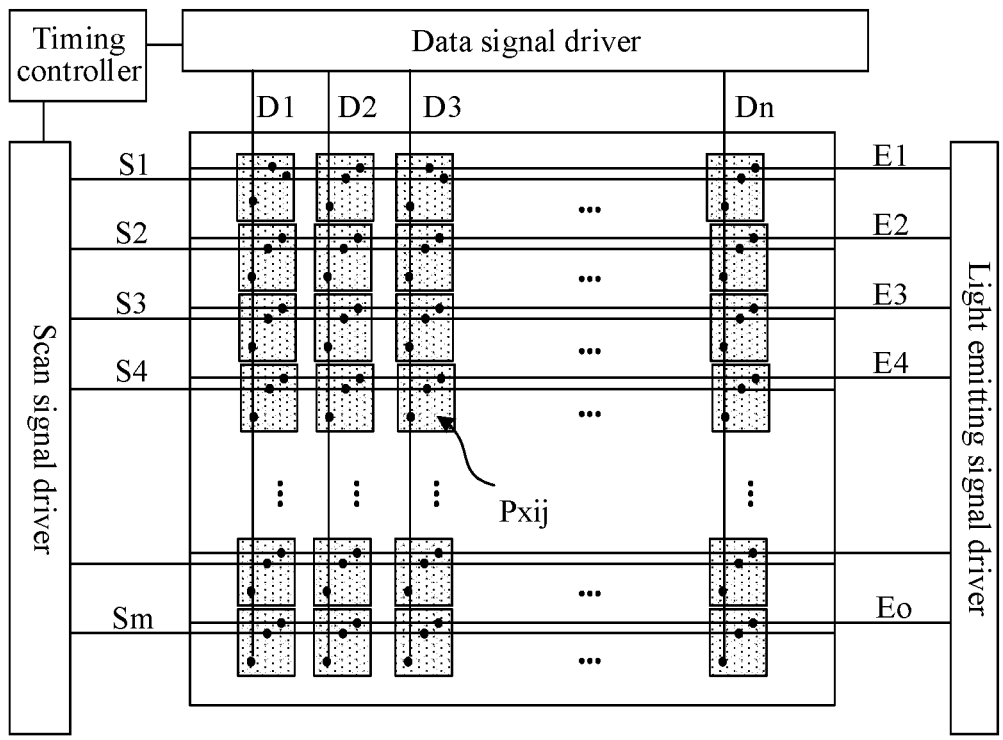
FIG. 1 is a schematic diagram of a structure of a display device.

| 10-first fixing structure; | 11-first substrate; | 12-first electrode; |
| 20-second fixing structure; | 21-second substrate; | 22-second electrode; |
| 31-first housing; | 32-second housing; | 33-connector; |
| 34-rotating shaft; | 41-first cylinder; | 42-first connecting piece; |
| 51-second cylinder; | 52-second connecting piece; | 61-third cylinder; |
| 62-third electrode; | 71-fourth cylinder; | 72-fourth electrode; |
| 100-Display panel; | 101-reinforcing layer; | 102-first adhesive layer; |
| 103-display substrate layer; | 104-second adhesive layer; | 105-touch substrate layer; |
| 106-third adhesive layer; | 107-cover plate layer; | 200-first unfolded area; |
| 201-first display area; | 202-first frame area; | 300-bending area; |
| 400-second unfolded area; | 401-second display area; | 402-second frame area; |
| 500-mounting groove; | 501-first groove wall; | 502-second groove wall; |
| 510-groove bottom surface; | 600-capacitive sensor. | |

DETAILED DESCRIPTION

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

Scales of the drawings in the present disclosure may be used as a reference in the actual process, but are not limited thereto. For example, the width-length ratio of the channel, the thickness and spacing of each film layer, and the width and spacing of each signal line may be adjusted according to the actual needs. The number of pixels in the display substrate and the number of sub-pixels in each pixel are not limited to the number shown in the drawings. The drawings described in the present disclosure are schematic structure diagrams only, and one implementation of the present disclosure is not limited to the shapes, numerical values or the like shown in the drawings.

Ordinal numerals such as "first", "second", and "third" in the specification are set to avoid confusion of constituent elements, but not to set a limit in quantity.

In the specification, for convenience, wordings indicating directional or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the constituent elements. Therefore, appropriate replacements can be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be the drain electrode, and a second electrode may be the source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode", as well as the "source terminal" and the "drain terminal" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulating layer" sometimes.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be guide angle, arc edge and deformation, etc.

In the present disclosure, "about" refers to that a boundary is defined not so strictly and numerical values within process and measurement error ranges are allowed.

With the development of display technology, a flexible display device may be wound, folded and bent to change its screen size. Therefore, a rollable display device, a bendable display device, a foldable display device, or a slidable display device is formed, which can be applied not only to mobile devices such as smart phones and flat-panel personal computers, but also to televisions, vehicle display devices and wearable devices. The application fields of the flexible display device are expanding. The foldable display device has been gradually applied to folding mobile phones and other electronic devices because of its flexible and foldable characteristics, which can make the display device thinner and more portable.

FIG. 1 is a schematic diagram of a structure of a display device. As shown in FIG. 1, the display apparatus may include a timing controller, a data driver, a scan driver, a light emitting driver and a pixel array. The timing controller is connected to the data driver, the scan driver and the light emitting driver, respectively, the data driver is connected to a plurality of data signal lines (D1 to Dn) respectively, the scan driver is connected to a plurality of scan signal lines (S1 to Sm) respectively, and the light emitting driver is connected to a plurality of light emitting signal lines (E1 to Eo)

respectively. A pixel array may include a plurality of sub-pixels Pxij, i and j may be natural numbers, at least one sub-pixel Pxij may include a circuit unit and a light emitting device connected to the circuit unit, and the circuit unit may include at least one scan signal line, at least one data signal line, at least one light emitting signal line and a pixel drive circuit. In an exemplary embodiment, the timing controller may provide a gray value and a control signal, which are suitable for a specification of the data driver, to the data driver, provide a clock signal, a scan start signal, etc., which are suitable for a specification of the scan driver, to the scan driver, and provide a clock signal, a transmit stop signal, etc., which are suitable for a specification of the light emitting driver, to the light emitting driver. The data driver may generate a data voltage to be provided to the data signal lines D1, D2, D3, . . . , and Dn by using the gray-scale value and the control signal that are received from the timing controller. For example, the data driver may sample the gray value by using the clock signal and apply a data voltage corresponding to the gray value to the data signal lines D1 to Dn by taking a pixel row as a unit, wherein n may be a natural number. The scanning driver may receive the clock signal, the scan starting signal, etc., from the timing controller to generate a scanning signal to be provided to the scanning signal lines S1, S2, S3, . . . , and Sm. For example, the scan driver may provide sequentially a scan signal with a turn-on level pulse to the scan signal lines S1 to Sm. For example, the scan driver may be constructed in a form of a shift register and may generate a scan signal in such a manner as to transmit sequentially the scan start signal provided in a form of a turn-on level pulse to a next-stage circuit under the control of the clock signal, wherein m may be a natural number. The light emitting driver may receive a clock signal, an emission stopping signal, etc., from the timing controller to generate an emission signal to be provided to the light emitting signal lines E1, E2, E3, . . . , and Eo. For example, the light emitting driver may provide a transmit signal with a turn-off level pulse to the light emitting signal lines E1 to Eo sequentially. For example, the light emitting driver may be constructed in a form of a shift register and may generate a transmit signal in such a manner as to transmit sequentially the transmit stop signal provided in a form of a turn-off level pulse to a next-stage circuit under the control of the clock signal, wherein o may be a natural number.

The present disclosure provides a foldable display device, including a display panel, at least one capacitive sensor and at least one detection circuit, wherein the display panel includes at least one bending area configured for bending, the capacitive sensor includes a first electrode structure and a second electrode structure configured to form a sensing capacitor, and the detection circuit is connected to the first electrode structure and the second electrode structure, respectively, and is configured to detect a capacitance value of the sensing capacitor and obtain a bending angle of the foldable display device according to the capacitance value or a capacitance change amount of the sensing capacitor.

In an exemplary embodiment, the capacitive sensor may be provided on the display panel, the first electrode structure is connected to a first unfolded area, and the second electrode structure is connected to a second unfolded area. The first electrode structure and the second electrode structure form a sensing capacitor capable of changing a capacitance value with a bending angle, so that the detection circuit may obtain a bending angle of the foldable display device according to the capacitance change amount of the sensing capacitor.

Figure 2:
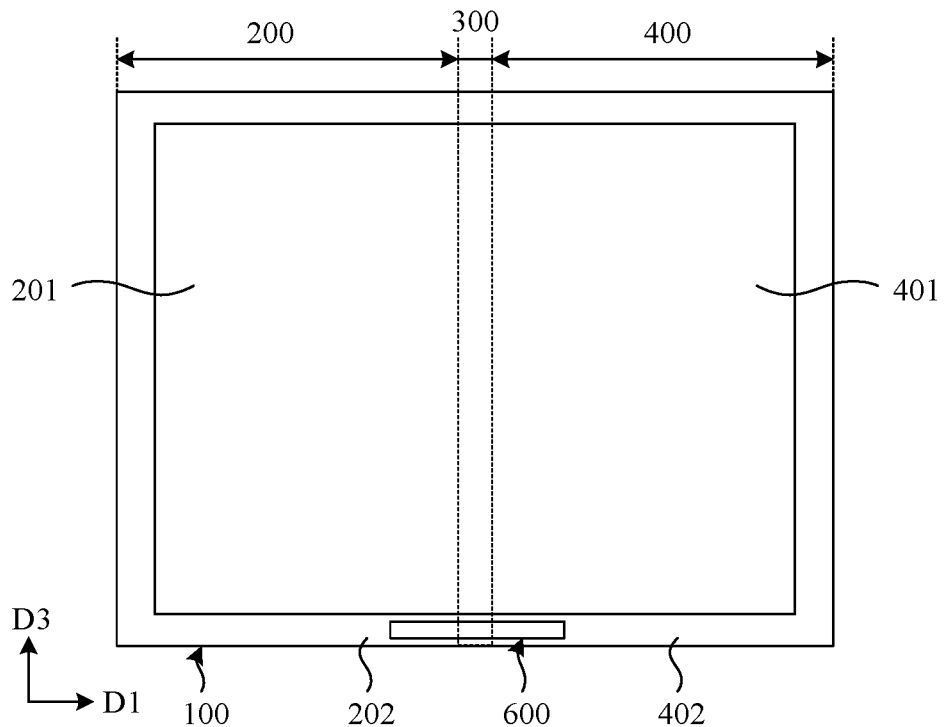
FIG. 2 is a schematic diagram of a structure of a foldable display device according to an exemplary embodiment of the present disclosure.

FIG. 2 is a schematic diagram of a structure of a foldable display device according to an exemplary embodiment of the present disclosure. As shown in FIG. 2, in an exemplary embodiment, the foldable display device may include a display panel 100, at least one capacitive sensor 600, and at least one detection circuit (not shown in FIG. 2). The capacitive sensor 600 is provided on the display panel 100 and configured to form a sensing capacitor capable of changing a capacitance value with a bending angle. The detection circuit is connected to the capacitive sensor 600 and configured to detect a capacitance value of the sensing capacitor and obtain a bending angle of the foldable display device according to the capacitance change amount of the sensing capacitor.

In an exemplary embodiment, the display panel 100 may have a rectangular shape. The display panel 100 may at least include a first unfolded area 200, a bending area 300 and a second unfolded area 400 provided in sequence along a first direction D1, wherein the first unfolded area 200 is located on a side opposite to the first direction D1 of the bending area 300, and the second unfolded area 400 is located on a side of the first direction D1 of the bending area 300. In an exemplary embodiment, a bending area refers to an area that needs to be bent when the display panel is bent, and an unfolded area refers to an area where bending does not occur or the degree of bending is small when the display panel is bent.

In an exemplary embodiment, the bending area 300 may be in a strip shape extending in a third direction D3 and the first unfolded area 200 and the second unfolded area 400 may be in a rectangular shape. The first unfolded area 200 may include a first display area 201 and a first frame area 202 located on at least one side of the first display area 201 in the third direction D3, and the second unfolded area 400 may include a second display area 401 and a second frame area 402 located on at least one side of the second display area 401 in a second direction D2, the third direction D3 intersecting with the first direction D1.

In an exemplary embodiment, the display panel 100 may include a plurality of bending areas 300, or the display panel 100 may include at least one bending area 300 and at least one unfolded area provided in the third direction D3, and the number, division manner and positional relationship of the bending areas and the unfolded areas may be determined according to actual needs, which are not limited in the present disclosure. In the following exemplary embodiments, the illustration is made by taking a display panel including three portions (a bending area, and a first unfolded area and a second unfolded area on two sides of the bending area, respectively) as an example.

Figure 3A:
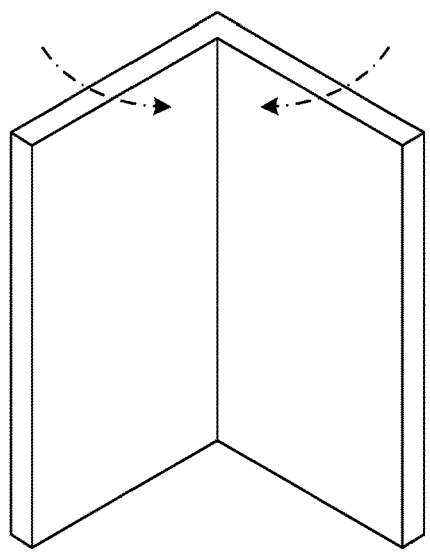
FIGS. 3a and 3b are schematic diagrams of a foldable display device in a folded state.
Figure 3B:
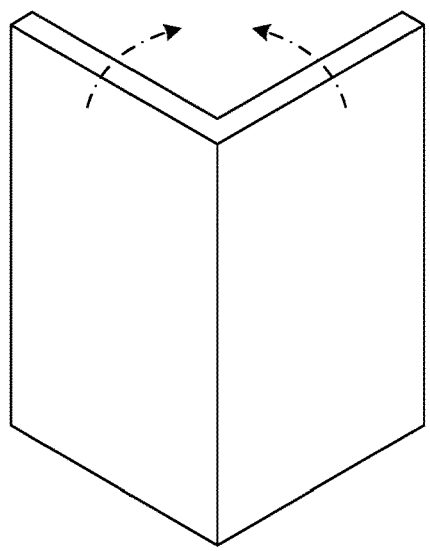

FIGS. 3a and 3b are schematic diagrams of a foldable display device in a folded state. In an exemplary embodiment, the display device may be provided with a rotating shaft which may extend in a third direction D3 and the unfolded area may be deflected relative to the rotating shaft to achieve folding. In an exemplary embodiment, the foldable display device may achieve an inward folded state as shown in FIG. 3a or the foldable display device may achieve an outward folded state as shown in FIG. 3b. When the foldable display device is in a folded state, no matter whether it is folded inward or outward, there is usually a color cast problem in the folding area and its vicinity with the change of a folding angle, resulting in poor consumer experience. At present, one of the reasons for the failure to effectively solve the problem of color cast in bending area is the lack of real-time monitoring means of bending angle. Traditional angle sensors are not suitable for display devices with small thickness because of their large size (usually diameter ≥25 mm) and requirement of large voltage/current drive.

In an exemplary embodiment, the first electrode structure may include a first electrode as an electrode plate of the sensing capacitor, the second electrode structure may include a second electrode as another electrode plate of the sensing capacitor, an orthographic projection of the first electrode on a plane of the foldable display device overlaps at least partially with an orthographic projection of the second electrode on the plane of the foldable display device, and an overlapping area between the first electrode and the second electrode has a one-to-one corresponding relationship with the bending angle.

In an exemplary embodiment, the orthographic projection of the first electrode on the plane of the foldable display device and the orthographic projection of the second electrode on the plane of the foldable display device have a first overlapping area when the foldable display device is not bent. The orthographic projection of the first electrode on the plane of the foldable display device and the orthographic projection of the second electrode on the plane of the foldable display device have a second overlapping area when the foldable display device is bent. In an exemplary embodiment, the first overlapping area may be greater than the second overlapping area.

In an exemplary embodiment, the capacitive sensor 600 may have a strip shape extending in the first direction D1. A portion of the capacitive sensor 600 is provided on a side of the first frame area 202 close to the bending area 300, another portion of the capacitive sensor 600 is provided on a side of the second frame area 402 close to the bending area 300, and a middle portion of the capacitive sensor 600 is provided in the bending area 300. That is, a first end of the capacitive sensor 600 is located in the first frame area 202, and a second end of the capacitive sensor 600 extends in the first direction D1 and is located in the second frame area 402 after crossing the bending area 300.

In an exemplary embodiment of the present disclosure, a capacitive sensor is provided on a display panel, and when the foldable display device is bent, the capacitive sensor may change the capacitance value along with the folding angle. The capacitance change amount of the capacitive sensor has a one-to-one corresponding relationship with the folding angle of the foldable display device, and therefore the folding angle of the foldable display device may be obtained by detecting the capacitance change amount of the capacitive sensor by the detection circuit.

FIGS. 4a to 4d are schematic diagrams of a structure of a capacitive sensor according to an exemplary embodiment of the present disclosure. In an exemplary embodiment, the capacitive sensor may include a first electrode structure and a second electrode structure provided oppositely. The first electrode structure may include a first substrate 11 and a first electrode 12, and the second electrode structure may include a second substrate 21 and a second electrode 22. The first electrode 12 is provided on a side of the first substrate 11 facing the second substrate 21, the second electrode 22 is provided on a side of the second substrate 21 facing the first substrate 11, and an orthographic projection of the first electrode 12 on the second substrate 21 overlaps at least partially with an orthographic projection of the second electrode 22 on the second substrate 21, so that the first electrode 12 and the second electrode 22 form a sensing capacitor.

Figure 4A:
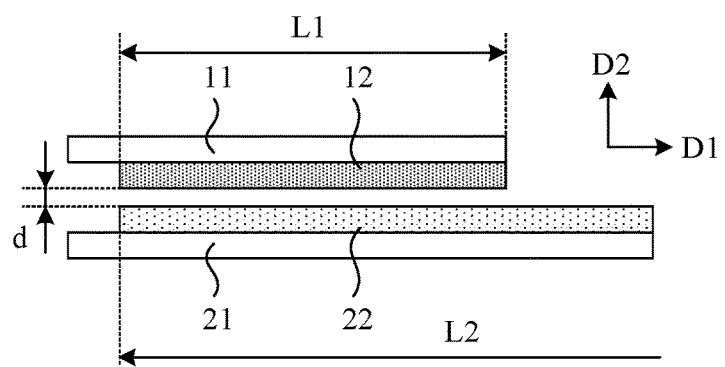
FIGS. 4a to 4d are schematic diagrams of a structure of a capacitive sensor according to an exemplary embodiment of the present disclosure.
Figure 4B:
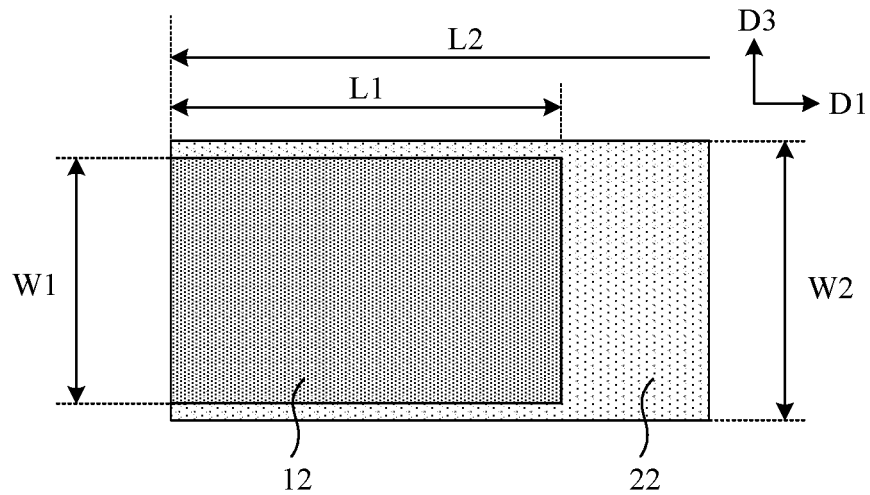

FIG. 4a is a schematic diagram of a relative position of a first electrode and a second electrode when a foldable display device is not bent, and FIG. 4b is a top view of FIG. 4a. As shown in FIGS. 4a and 4b, the first electrode 12 and the second electrode 22 may have a rectangular shape, the first electrode 12 has a first length L1 and a first width W1, the second electrode 22 has a second length L2 and a second width W2, and a distance d is provided between the first electrode 12 and the second electrode 22. In an exemplary embodiment of the present disclosure, the length is a dimension in the first direction D1, the width is a dimension in the third direction D3, the distance is a dimension in the second direction D2, and the second direction D2 intersects with the first direction D1 and the third direction D3.

In an exemplary embodiment, the first length L1 of the first electrode 12 may be smaller than the second length L2 of the second electrode 22, and the first width W1 of the first electrode 12 may be smaller than the second width W2 of the second electrode 22. An orthographic projection of the first electrode 12 on the second substrate 21 may be within a range of an orthographic projection of the second electrode 22 on the second substrate 21 when the foldable display device is not bent. Thus, an overlapping length of the orthographic projections of the first electrode 12 and the second electrode 22 on the second substrate 21 is the first length L1, and an overlapping width of the orthographic projections of the first electrode 12 and the second electrode 22 on the second substrate 21 is the first width W1.

According to the capacitance calculation formula, when the foldable display device is not bent, an initial capacitance value C0 of the sensing capacitor formed by the first electrode 12 and the second electrode 22 is:

$$C0 = \frac{\varepsilon \times W1 \times L1}{4\pi kd}$$

where ε is a dielectric constant of a dielectric between electrode plates, and k is a constant of electrostatic force.

Figure 4C:
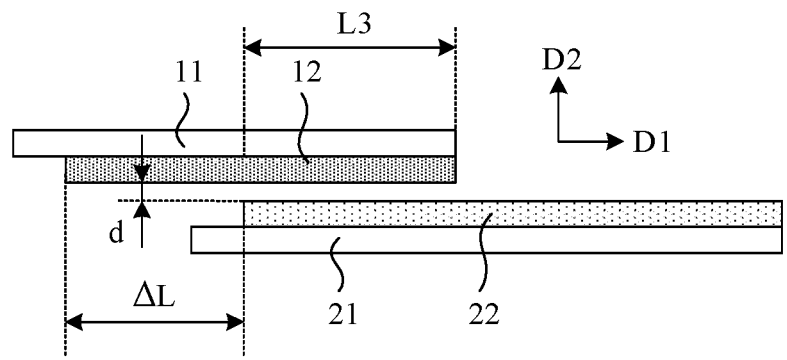
Figure 4D:
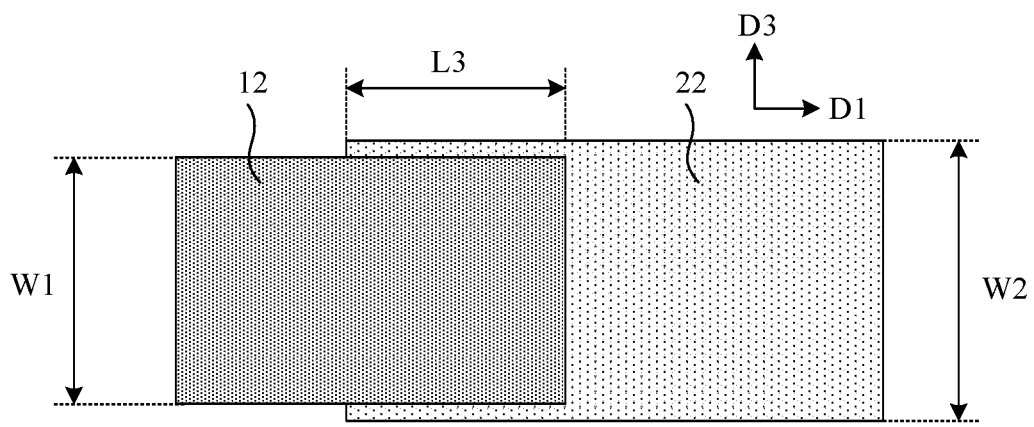

FIG. 4c is a schematic diagram of a relative position of a first electrode and a second electrode when a foldable display device is bent, and FIG. 4d is a top view of FIG. 4c. As shown in FIGS. 4c and 4d, when the foldable display device is bent, the second substrate 21 and the second electrode 22 are moved toward the first direction D1 by a pulling force in the first direction D1 by a distance ΔL, so that a size of the overlapping area between the first electrode 12 and the second electrode 22 changes. In an exemplary embodiment, it may be considered that the distance d between the first electrode 12 and the second electrode 22 is approximately constant and the first width W1 of the first electrode 12 and the second width W2 of the second electrode 22 are approximately constant.

In an exemplary embodiment, the change in the size of the overlapping area between the first electrode 12 and the second electrode 22 is a change in the overlapping length between the first electrode 12 and the second electrode 22. After the second electrode 22 is moved by a distance ΔL in the first direction D1, the overlapping length of the orthographic projections of the first electrode 12 and the second electrode 22 on the second substrate 21 is a third length L3. The third length L3=the first length L1−the moving distance ΔL, and the overlapping width W of the orthographic projections of the first electrode 12 and the second electrode 22 on the second substrate 21 is still the first width W1.

According to the capacitance calculation formula, when the foldable display device is bent, the bending capacitance value C1 of the sensing capacitor formed by the first electrode 12 and the second electrode 22 is:

$$C1 = \frac{\varepsilon \times W1 \times L3}{4\pi kd}$$

Then the difference between the initial capacitance value C0 and the bending capacitance value C1, i.e., C0–C1, is:

$$C0 - C1 = \frac{\varepsilon \times W1 \times (L1 - L3)}{4\pi kd} = \frac{\varepsilon \times W1 \times \Delta L}{4\pi kd}$$

According to the above calculation formula of capacitance value, when the foldable display device is not bent, the initial capacitance value C of the sensing capacitor is proportional to the first length L1, and when the foldable display device is bent, the bending capacitance value C1 of the sensing capacitor is proportional to the third length L3. The difference between the capacitance value of the sensing capacitor when the foldable display device is not bent and the capacitance value of the sensing capacitor when the foldable display device is bent is proportional to the moving distance ΔL (i.e., the difference between the first length L1 and the third length L3), i.e., ΔC∝ΔL, ΔC=C0–C1, and ΔL=L1–L3. Thus, when the bending angle of the foldable display device is proportional to the moving distance ΔL of the second electrode 22, the capacitance change amount of the sensing capacitor is proportional to the bending angle of the foldable display device when the foldable display device is bent, so that the bending angle of the foldable display device may be obtained according to the capacitance change amount of the capacitive sensor (the difference between the initial capacitance value C and the bending capacitance value C1).

Figure 5A:
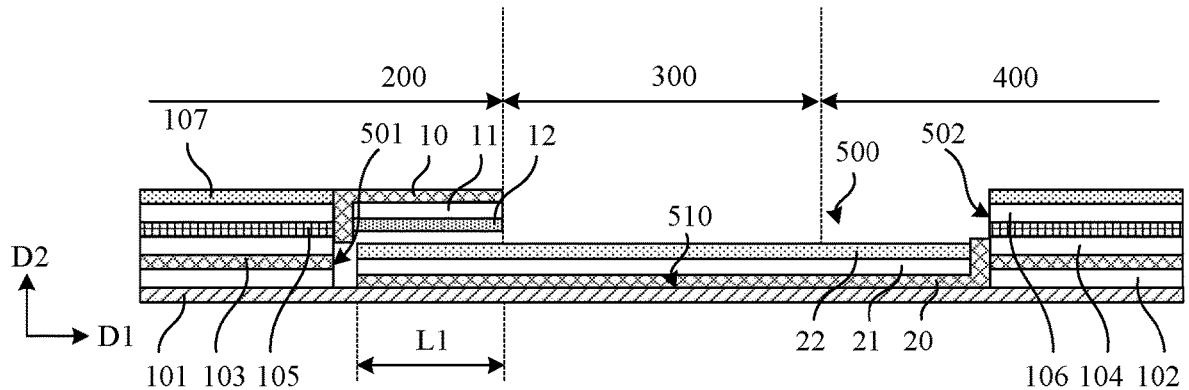
FIGS. 5a and 5b are schematic diagrams of a structure of a capacitive sensor provided on a display panel according to the present disclosure.
Figure 5B:
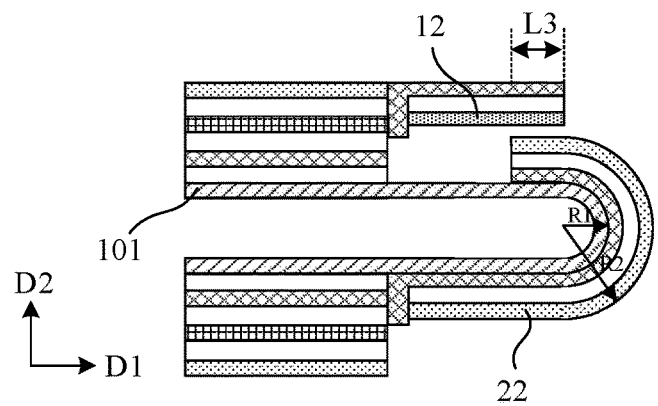

FIGS. 5a and 5b are schematic diagrams of a structure of a capacitive sensor provided on a display panel according to an exemplary embodiment of the present disclosure, FIG. 5a is a schematic diagram of a relative position of a first electrode and a second electrode when a foldable display device is not bent, and FIG. 5b is a schematic diagram of a relative position of a first electrode and a second electrode when a foldable display device is bent. In an exemplary embodiment, the display panel may at least include a reinforcing layer 101 and a display structure layer provided on the reinforcing layer 101. In an exemplary embodiment, the display structure layer may at least include a display substrate layer 103, a touch substrate layer 105 and a cover plate layer 107. The display substrate layer 103 may be connected to the reinforcing layer 101 through a first adhesive layer 102, the touch substrate layer 105 may be connected to a surface of the display substrate layer 103 on a side away from the reinforcing layer 101 through a second adhesive layer 104, and the cover plate layer 107 may be connected to a surface of the touch substrate layer 105 on a side away from the reinforcing layer 101 through a third adhesive layer 106.

In an exemplary embodiment, the reinforcing layer 101 may be made of steel use stainless (SUS), the first adhesive layer 102 may be made of foam, the second adhesive layer 104 and the third adhesive layer 106 may employ an optical clear adhesive (OCA), the surface of the display substrate layer 103 on the side away from the reinforcing layer 101 may be provided with a polarizer, and the cover plate layer 107 may include a capping layer (CPL) connected to the touch substrate layer 105 through the third adhesive layer 106 and a hardened layer (H/C) provided on a side of the cover layer away from the reinforcing layer 101, which is not limited herein.

In an exemplary embodiment, a thickness of the reinforcing layer 101 may be about 120 μm to 170 μm, for example, it may be about 150 μm. A thickness of the first adhesive layer 102 may be about 140 μm to 180 μm, for example, it may be about 160 μm. A thickness of the display substrate layer 103 may be about 120 μm to 170 μm, for example, it may be about 144 μm. A thickness of the polarizer may be about 80 μm to 120 μm, for example, it may be about 99 μm. A thickness of the second adhesive layer 104 may be about 80 μm to 120 μm, for example, it may be about 100 μm. A thickness of the touch substrate layer 105 may be about 30 μm to 70 μm, for example, it may be about 50 μm. A thickness of the third adhesive layer 106 may be about 80 μm to 120 μm, for example, it may be about 100 μm. The thickness of the cover plate layer 107 may be about 70 μm to 110 μm, for example it may be about 90 μm.

In an exemplary embodiment, on a plane parallel to the display panel, the display substrate layer may include a plurality of pixel units arranged in a matrix manner. At least one pixel unit may include a first sub-pixel emitting a first color light, a second sub-pixel emitting a second color light, and a third sub-pixel emitting a third color light. At least one sub-pixel may include a circuit unit and a light emitting device. The circuit unit may include a scan signal line, a data signal line, a light emitting signal line and a pixel drive circuit. The pixel drive circuit is connected to the scanning signal line, the data signal line, and the light emitting signal line, respectively. The pixel drive circuit is configured to receive a data voltage transmitted by the data signal line under control of the scanning signal line and the light emitting signal line, and output a corresponding current to the light emitting device. The light emitting device in the sub-pixel is connected to a pixel drive circuit of a sub-pixel where the light emitting device is located, and is configured to emit light with a corresponding brightness in response to a current output by the pixel drive circuit of the sub-pixel where the light emitting device is located.

In an exemplary embodiment, in the plane perpendicular to the display panel, the display substrate layer may include a drive circuit layer provided on the substrate, a light emitting structure layer provided on a side of the drive circuit layer away from the substrate, and an encapsulation layer provided on a side of the light emitting structure layer away from the substrate. In an exemplary embodiment, the substrate may be a flexible substrate. The drive circuit layer may include a plurality of signal lines and a pixel drive circuit. The pixel drive circuit may include a plurality of transistors and a storage capacitor. The light emitting structure layer may include a plurality of film layers constituting the light emitting device. The plurality of film layers may include an anode, a pixel definition layer, an organic light emitting layer and a cathode. The anode is connected to a drain electrode of a drive transistor through a via hole, the organic light emitting layer is connected to the anode, the cathode is connected to the organic light emitting layer, and the organic light emitting layer is driven by the anode and the cathode to emit light with a corresponding color. The encapsulation layer may include a first encapsulation layer, a second encapsulation layer, and a third encapsulation layer that are stacked. The first encapsulation layer and the third encapsulation layer may be made of an inorganic material, and the second encapsulation layer may be made of an organic material. The second encapsulation layer is provided between the first encapsulation layer and the third encapsulation layer to ensure that external water vapor cannot enter the light emitting structure layer.

In an exemplary embodiment, the touch substrate layer may include a plurality of touch units on a plane parallel to the display panel. The touch substrate layer may include an insulating layer and a touch electrode layer on a plane perpendicular to the display panel.

In an exemplary embodiment, the display panel is provided with a mounting groove 500 configured to mount and fix the capacitive sensor 600. The mounting groove 500 may have a strip shape extending in the first direction D1, a first end of the mounting groove 500 may be located within the first unfolded area 200, a second end of the mounting groove 500 may be located within the second unfolded area 400, and an area between the first end of the mounting groove 500 and the second end of the mounting groove 500 spans the bending area 300. In an exemplary embodiment, a first end of the mounting groove 500 may be located within a first frame area 202 in the first unfolded area 200, and a second end of the mounting groove 500 may be located within a second frame area 402 in the second unfolded area 400 to avoid affecting normal display of the display panel.

In an exemplary embodiment, the first adhesive layer 102, the display substrate layer 103, the second adhesive layer 104, the touch substrate layer 105, the third adhesive layer 106 and the cover plate layer 107 in the mounting groove 500 are removed to expose a surface of the reinforcing layer 101 such that a first end of the mounting groove 500 has a first groove wall 501 facing the bending area 300, a second end of the mounting groove 500 has a second groove wall 502 facing the bending area 300, and a bottom of the mounting groove 500 has a groove bottom surface 510 facing the second direction D2. The first groove wall 501 exposes a film layer end face of the first unfolded area 200 (except for the reinforcing layer 101), the second groove wall 502 exposes a film layer end face of the second unfolded area 400 (except for the reinforcing layer 101), and the groove bottom surface 510 exposes a surface of the reinforcing layer 101.

In an exemplary embodiment, a sectional shape of the mounting groove 500 may be rectangular, trapezoidal or polygonal in a plane parallel to the foldable display device.

In an exemplary embodiment, a sectional shape of the mounting groove 500 may be rectangular, trapezoidal or polygonal in a plane perpendicular to the foldable display device.

In an exemplary embodiment, the capacitive sensor may include a first electrode structure and a second electrode structure that are provided oppositely and capable of changing relative positions with a bending angle. The first electrode structure and the second electrode structure are configured to form a sensing capacitor capable of changing a capacitance value with a bending angle. The first electrode structure may include a first fixing structure 10, a first substrate 11, and a first electrode 12, and the second electrode structure may include a second fixing structure 20, a second substrate 21, and a second electrode 22. The first fixing structure 10 may be connected to the first groove wall 501 of the mounting groove 500, i.e., the first fixing structure 10 is connected to the first unfolded area 200. The first substrate 11 is provided on a side of the first fixing structure 10 close to the reinforcing layer 101, and the first electrode 12 is provided on a side of the first substrate 11 close to the reinforcing layer 101. The second fixing structure 20 may be connected to the second groove wall 502 of the mounting groove 500, i.e., the second fixing structure 20 is connected to the second unfolded area 400. The second substrate 21 is provided on a side of the second fixing structure 20 away from the reinforcing layer 101, and the second electrode 22 is provided on a side of the second substrate 21 away from the reinforcing layer 101.

In an exemplary embodiment, the first fixing structure 10 may include a first bottom frame and a first side frame. The first bottom frame may be in a strip shape extending in the first direction D1. The first side frame may be in a strip shape extending in the second direction D2. The first side frame is connected to an end of the first bottom frame away from the bending area 300, the first substrate 11 may be provided on a side of the first bottom frame close to the reinforcing layer 101, and the first side frame may be connected to the first groove wall 501 of the mounting groove 500.

In an exemplary embodiment, the first side frame may be connected to the groove bottom surface 510 of the mounting groove 500 located in the first unfolded area 200 while the first side frame is not connected to the first groove wall 501 of the mounting groove 500. Alternatively, the first side frame may be connected to both the first groove wall 501 of the mounting groove 500 and the groove bottom surface 510 located in the first unfolded area 200.

In an exemplary embodiment, the first fixing structure 10 and the first substrate 11 may be in an integral structure.

In an exemplary embodiment, the second fixing structure 20 may include a second bottom frame and a second side frame. The second bottom frame may be in a strip shape extending in the first direction D1. The second side frame may be in a strip shape extending in the second direction D2. The second side frame is connected to an end of the second bottom frame away from the bending area 300, the second substrate 21 may be provided on a side of the second bottom frame away from the reinforcing layer 101, and the second side frame may be connected to the second groove wall 502 of the mounting groove 500.

In an exemplary embodiment, the second bottom frame may be connected to the groove bottom surface 510 of the mounting groove 500 located in the second unfolded area 400 while the second side frame is not connected to the second groove wall 502 of the mounting groove 500. Alternatively, the second bottom frame may be connected to both the second groove wall 502 of the mounting groove 500 and the groove bottom surface 510 located in the second unfolded area 400.

In an exemplary embodiment, the second fixing structure 20 and the second substrate 21 may be in an integral structure.

In an exemplary embodiment, an orthographic projection of the first electrode 12 of the first electrode structure on the reinforcing layer 101 overlaps at least partially with an orthographic projection of the second electrode 22 of the second electrode structure on the reinforcing layer 101 such that the first electrode 12 and the second electrode 22 form a sensing capacitor.

As shown in FIGS. 5a and 5b, when the foldable display device is not bent, an overlapping length between the first electrode 12 and the second electrode 22 is a first length L1. Since the first electrode structure is connected to the first unfolded area 200 and the second electrode structure is connected to the second unfolded area 400, the first unfolded area 200 and the second unfolded area 400 are deflected with respect to the bending area 300 when the foldable display device is bent so that the first electrode structure and the second electrode structure are also deflected with respect to the bending area 300, and a relative position of the first electrode structure and the second electrode structure is changed. As for the second electrode structure, due to the difference in arc lengths of a film layer where the second electrode 22 is located and a film layer where the reinforcing layer 101 is located in the bending state at different angles, when the bending angle is θ°, a moving distance of the second electrode 22 relative to the first electrode 12 is $\Delta L = \pi*(R2-R1)*\theta°/180°$, where R1 is a bending radius of the reinforcing layer 101 in the bending area 300, and R2 is a bending radius of the second electrode 22 in the bending area 300. Because a thickness of each film layer in the display panel is a fixed value, the moving distance ΔL is proportional to the bending angle θ°, that is, $\Delta L \propto \theta°$.

In an exemplary embodiment, when the display device is fully folded (bending angle θ° is) 180°, the moving distance ΔL of the second electrode 22 with respect to the first electrode 12 is $\Delta L = \pi*(R2-R1)$, that is, the moving distance ΔL is a difference of half circumference, the overlapping length between the first electrode 12 and the second electrode 22 is a third length L3, and the third length L3=the first length L1−moving distance ΔL.

In an exemplary embodiment, since the difference between an initial capacitance of the capacitive sensor when the foldable display device is not bent and a bending capacitance value of the capacitive sensor when the foldable display device is bent is proportional to the moving distance ΔL of the second electrode 22 relative to the first electrode 12, when the foldable display device is bent, the moving distance ΔL of the second electrode 22 relative to the first electrode 12 is proportional to the bending angle θ°. Therefore, the difference between the initial capacitance value of the capacitive sensor when the foldable display device is not bent and the bending capacitance value of the capacitive sensor when the foldable display device is bent is proportional to the bending angle θ°. The bending angle θ° of the foldable display device may be obtained according to the difference between the initial capacitance value C of the capacitive sensor and the bending capacitance value C1.

In an exemplary embodiment, the first substrate and the second substrate may be made of an insulating material, such as any one or more of silicon oxide (SiOx), silicon nitride (SiNx), and silicon oxynitride (SiON), and may be a single layer, multiple layers or a composite layer. The first electrode and the second electrode may be made of copper foil or other material having good electrical conductivity, and the second electrode has good elasticity and flexibility, which is not limited in the present disclosure.

Figure 6:
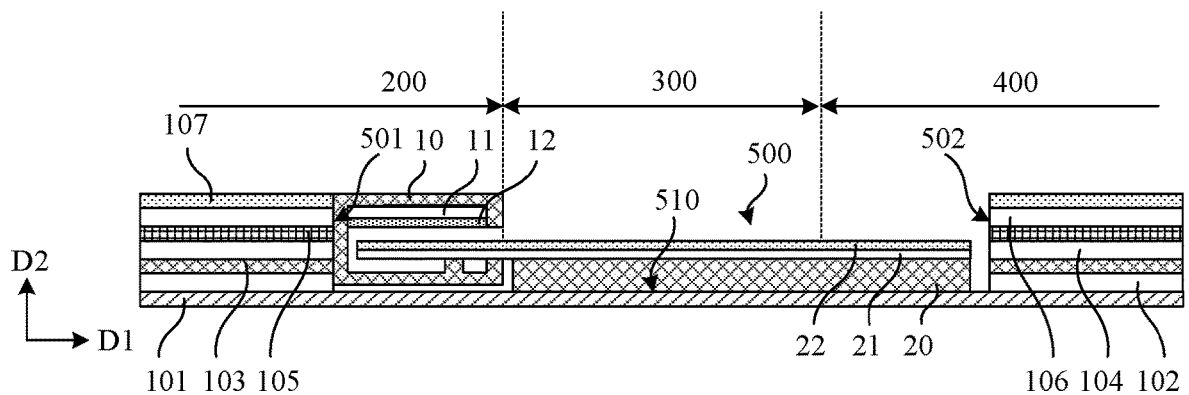
FIG. 6 is another schematic diagram of a structure of a capacitive sensor provided on a display panel according to the present disclosure.

FIG. 6 is another schematic diagram of a structure of a capacitive sensor provided on a display panel according to an exemplary embodiment of the present disclosure, and is a schematic diagram of a relative position of the first electrode and the second electrode when the foldable display device is not bent. In an exemplary embodiment, the structure of the foldable display device is similar to that of the foregoing exemplary embodiment. The foldable display device includes a display panel and a capacitive sensor. The display panel is provided with a mounting groove 500 configured to fix the capacitive sensor. The capacitive sensor may include a first electrode structure and a second electrode structure of which a relative position may be changed.

In an exemplary embodiment, the first electrode structure may include a first fixing structure 10, a first substrate 11 and a first electrode 12. The first fixing structure 10 may be an annular chamber structure and connected to a first groove wall 501 of the mounting groove 500, and the first substrate 11 and the first electrode 12 are provided in a chamber of the first fixing structure 10.

In an exemplary embodiment, the first fixing structure 10 may include a first side, a second side, a third side and a fourth side connected in turn and forming an annular chamber. The first side and the third side extend in the first direction D1, and the second side and the fourth side extend in the second direction D2. The first side is provided on a side of the annular chamber away from the reinforcing layer 101, the third side is provided on a side of the annular chamber close to the reinforcing layer 101, the second side is provided on a side of the annular chamber close to the bending area 300, and the fourth side is provided on a side of the annular chamber away from the bending area 300 and connected to the first groove wall 501 of the mounting groove 500.

In an exemplary embodiment, the first substrate 11 is provided on a side of the first side facing the reinforcing layer 101 and the first electrode 12 is provided on a side of the first substrate 11 facing the reinforcing layer 101. In one possible exemplary embodiment, the first substrate 11 may be integrally structured with the first side, and the first electrode 12 is provided on a side of the first side facing the reinforcing layer 101.

In an exemplary embodiment, the second side may be provided with at least one opening through the second side. The opening is configured such that the second electrode 22 of the second electrode structure extends into the annular chamber such that an orthographic projection of the first electrode 12 on the reinforcing layer 101 overlaps at least partially with an orthographic projection of the second electrode 22 on the reinforcing layer 101.

In an exemplary embodiment, the third side may be provided with at least one support table configured to support the second electrode 22 extending into the annular chamber.

In an exemplary embodiment, the third side may be connected to a groove bottom surface 510 located in the first unfolded area 200.

In an exemplary embodiment, the second electrode structure may include a second fixing structure 20, a second substrate 21, and a second electrode 22. The second fixing structure 20 may be a strip-shaped support layer extending in the first direction D1. The strip-shaped support layer may be connected to the groove bottom surface 510 of the mounting groove 500, and/or the strip-shaped support layer may be connected to a second groove wall 502 of the mounting groove 500. The second electrode 22 and a first portion of the second substrate 21 close to the first unfolded area 200 extend into the annular chamber of the first fixing structure 10 such that an orthographic projection of the first electrode 12 on the reinforcing layer 101 overlaps at least partially with an orthographic projection of the second electrode 22 on the reinforcing layer 101, and the first electrode 12 and the second electrode 22 form a sensing capacitor. The second electrode 22 and a second portion of the second substrate 21 away from the first unfolded area 200 may be provided on a side of the strip-shaped support layer away from the reinforcing layer 101. In one possible exemplary embodiment, the second substrate 21 may be integrally structured with the strip-shaped support layer, a first portion of the second electrode 22 close to the first unfolded area 200 extends into the annular chamber of the first fixing structure 10, and a second portion of the second electrode 22 away from the first unfolded area 200 may be provided on a side of the strip-shaped support layer away from the reinforcing layer 101.

The structure according to the aforementioned exemplary embodiments of the present disclosure is only exemplary description. In an exemplary embodiment, corresponding structures may be varied according to actual needs. For example, a depth of the mounting groove may be set according to a height of the capacitive sensor, only a part of the film layer between the reinforcing layer and the cover plate layer may be removed, and the cover place layer covers the mounting groove. For another example, the reinforcing layer in the area where the mounting groove is located may have a slightly protruding local structure to facilitate the fixation and adhesion of the capacitive sensor. For another example, the first electrode structure and the second electrode structure may be in other structural forms in which the relative positional relationship may be changed with the bending angle, which is not limited in the present disclosure.

In another exemplary embodiment, the capacitive sensor may be provided on a housing carrying the display panel, and the first electrode structure and the second electrode structure form a sensing capacitor capable of changing the capacitance value with the bending angle, so that the detection circuit may obtain the bending angle of the foldable display device according to the capacitance value of the sensing capacitor.

Figure 7:
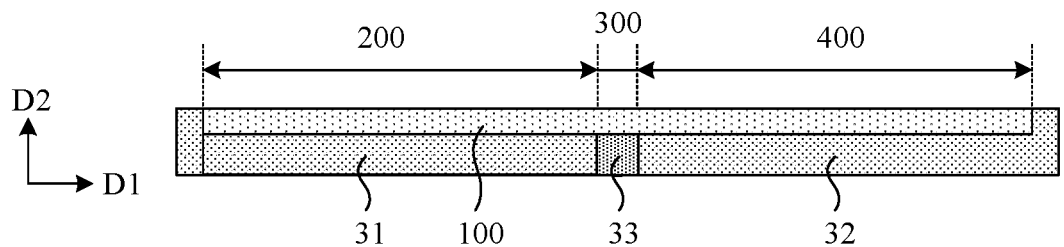
FIG. 7 is another schematic diagram of a structure of a foldable display device according to an exemplary embodiment of the present disclosure.

FIG. 7 is another schematic diagram of a structure of a foldable display device according to an exemplary embodiment of the present disclosure. In an exemplary embodiment, the foldable display device may include a display panel, a housing carrying the display panel, at least one capacitive sensor, and at least one detection circuit. The capacitive sensor is configured to form a sensing capacitor capable of changing a capacitance value with a bending angle. The detection circuit is connected to the capacitive sensor and configured to detect a capacitance value of the sensing capacitor and obtain a bending angle of the foldable display device according to the capacitance value of the sensing capacitor. As shown in FIG. 7, in an exemplary embodiment, a structure of the display panel 100 may be similar to that of the foregoing exemplary embodiment and may include at least a first unfolded area 200, a bending area 300 and a second unfolded area 400, wherein the first unfolded area 200 and the second unfolded area 400 are respectively located on two sides of the bending area 300. The housing carrying the display panel may include a first housing 31, a second housing 32 and a connector 33 connected between the first housing 31 and the second housing 32. In an exemplary embodiment, a position of the first unfolded area 200 may correspond to a position of the first housing 31 and be connected to the first housing 31, a position of the second unfolded area 400 may correspond to a position of the second housing 32 and be connected to the second housing 32, and a position of the connector 33 may correspond to a position of the bending area 300 and be connected only to the first housing 31 and the second housing 32.

In an exemplary embodiment, a first electrode structure and a second electrode structure of the capacitive sensor may be provided on the connector 33, and form a sensing capacitor capable of changing a capacitance value with a bending angle, so that the detection circuit may obtain a bending angle of the foldable display device according to the capacitance value of the sensing capacitor.

Figure 8A:
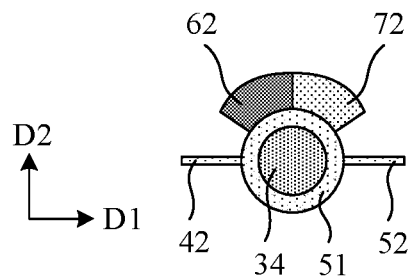
FIGS. 8a to 8c are schematic diagrams of a structure of a connector according to an exemplary embodiment of the present disclosure.
Figure 8B:
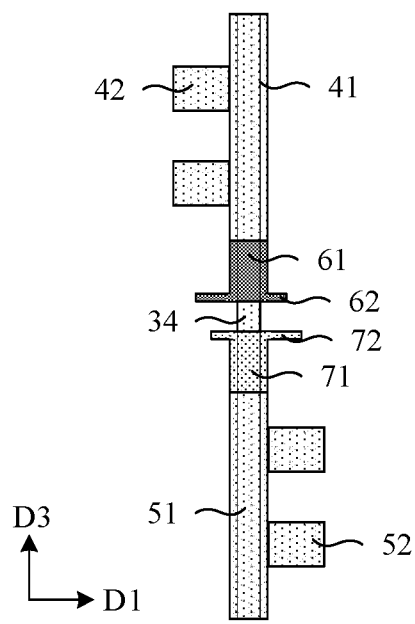
Figure 8C:
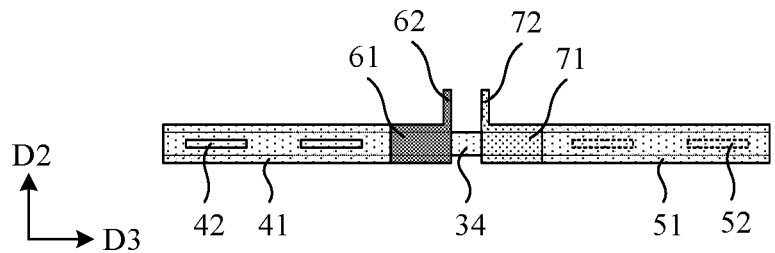

FIG. 8a is a schematic diagram of a structure of a connector according to an exemplary embodiment of the present disclosure, FIG. 8b is a top view of FIG. 8a, and FIG. 8c is a side view of FIG. 8a. As shown in FIGS. 8a to 8c, in an exemplary embodiment, the connector may include a rotating shaft 34 and a first connector, a second connector, a first electrode structure and a second electrode structure respectively sheathed on the rotating shaft 34. The first and second connectors are configured such that the first housing and the second housing may be deflected relative to the rotating shaft 34, thereby realizing the folding of the display device. The first electrode structure and the second electrode structure are configured to form a sensing capacitor capable of changing a capacitance value with a bending angle, so that a detection circuit may obtain a bending angle of the foldable display device according to the capacitance value of the sensing capacitor.

In an exemplary embodiment, the rotating shaft 34 may be cylindrical extending in the third direction D3, and may be made of an insulating material to ensure insulation between the first electrode structure and the second electrode structure.

In an exemplary embodiment, the first connector may include a first cylinder 41 and a first connecting piece 42 provided on the first cylinder 41. The first cylinder 41 may be a cylindrical body extending in the third direction D3, and may be sheathed at one end of the rotating shaft 34 (e.g., an end in the third direction D3). The first cylinder 41 and the rotating shaft 34 form a sliding connection structure. The first connecting piece 42 may be a plate-like body, which may be parallel to the plane (D1-D3 plane) when the display panel is fully unfolded. The first connecting piece 42 may be provided on a side of the first cylinder 41 close to the first housing 31, and fixedly connected to the first housing 31 through a slot structure provided on the first housing 31.

In an exemplary embodiment, the second connector may include a second cylinder 51 and a second connecting piece 52 provided on the second cylinder 51. The second cylinder 51 may be a cylindrical body extending in the third direction D3, and may be sheathed at one end of the rotating shaft 34 (e.g., an end in the opposite direction of the third direction D3). The second cylinder 51 and the rotating shaft 34 form a sliding connection structure. The second connecting piece 52 may be a plate-like body, which may be parallel to a plane (D1-D3 plane) when the display panel is fully unfolded. The second connecting piece 52 may be provided on a side of the second connecting piece 332 close to the second housing 32 and fixedly connected to the second housing 32 through a slot structure provided on the second housing 32.

In an exemplary embodiment, the first electrode structure may include a third cylinder 61 and a third electrode 62. The third cylinder 61 may be a cylindrical body extending in the third direction D3, and may be sheathed on the rotating shaft 34, positioned at one end of the first cylinder 41 close to the second cylinder 51, and connected to the first cylinder 41. The third electrode 62 may be a plate-like body, which may be parallel to a plane (D1-D2 plane) perpendicular to the rotating shaft, and the third electrode 62 is connected to the third cylinder 61.

In an exemplary embodiment, the second electrode structure may include a fourth cylinder 71 and a fourth electrode 72. The fourth cylinder 71 may be a cylindrical body extending in the third direction D3, and may be sheathed on the rotating shaft 34, positioned at one end of the second cylinder 51 close to the first cylinder 41, and connected to the second cylinder 51. The fourth electrode 72 may be a plate-shaped body, which may be parallel to a plane (D1-D2 plane) perpendicular to the rotating shaft, and the fourth electrode 72 is connected to the fourth cylinder 71.

In an exemplary embodiment, the third electrode 62 and the fourth electrode 72 are provided in a middle of the rotating shaft 34 and adjacent to each other. The third electrode 62 may serve as a plate electrode of the sensing capacitor, and the fourth electrode 72 may serve as another plate electrode of the sensing capacitor. An orthographic projection of the third electrode 62 in a plane perpendicular to the rotating shaft overlaps at least partially with an orthographic projection of the fourth electrode 72 in a plane perpendicular to the rotating shaft, such that an overlapping area between the third electrode 62 and the fourth electrode 72 may be changed with the bending angle, thereby forming a sensing capacitor capable of changing a capacitance value with the bending angle, and the overlapping area between the third electrode 62 and the fourth electrode 72 has a one-to-one corresponding relationship with the bending angle.

In an exemplary embodiment, when the first housing and the second housing are deflected with respect to the rotating shaft, the first housing and the second housing, on the one hand, drive the first unfolded area and the second unfolded area to be folded with respect to the rotating shaft, and on the other hand, drive the first cylinder and the second cylinder to rotate with respect to the rotating shaft. Accordingly, the first cylinder and the second cylinder respectively drive the third cylinder and the fourth cylinder to rotate, and the third cylinder and the fourth cylinder respectively drive the third electrode and the fourth electrode to deflect. Since the rotation directions of the first cylinder and the second cylinder are opposite, the rotation directions of the third electrode and the fourth electrode are opposite, and a size of the overlapping area between them changes.

In an exemplary embodiment, when the foldable display device is bent, because the rotation directions of the third electrode and the fourth electrode are opposite, the overlapping area between them changes, and the size of the overlapping area is proportional to the bending angle, and the size of the bending capacitance value is proportional to the bending angle, the bending angle of the foldable display device may be obtained according to the capacitance value of the sensing capacitor.

In an exemplary embodiment, the capacitance values of the sensing capacitor under different bending angles may be quantitated by means of calibration, so that the capacitance value of the sensing capacitor may be obtained in real time, and the bending angle information may be obtained by looking up a table.

In an exemplary embodiment, the shapes of the third electrode 62 and the fourth electrode 72 may be triangular, trapezoidal, sector-shaped or the like in a plane perpendicular to the rotating shaft, and the third electrode 62 and the fourth electrode 72 may be made of copper foil or other material having good electrical conductivity, which is not limited herein.

The structure according to the aforementioned exemplary embodiments of the present disclosure is only exemplary description. In an exemplary embodiment, corresponding structures may be varied according to actual needs. For example, the first cylinder and the third cylinder may be integrally structured and connected to each other, and the second cylinder and the fourth cylinder may be integrally structured and connected to each other. As another example, a plurality of first cylinders and a plurality of second cylinders may be provided, and the plurality of first cylinders and the plurality of second cylinders may be alternately provided in a third direction. For another example, the first electrode structure and the second electrode structure may be provided at an end of the rotating shaft. For another example, the first electrode structure and the second electrode structure may be designed as a modular structure and can be quickly assembled and fixed to the rotating shaft (hinge) of the display device by means of a bayonet structure or the like, which is not limited herein.

Figure 9:
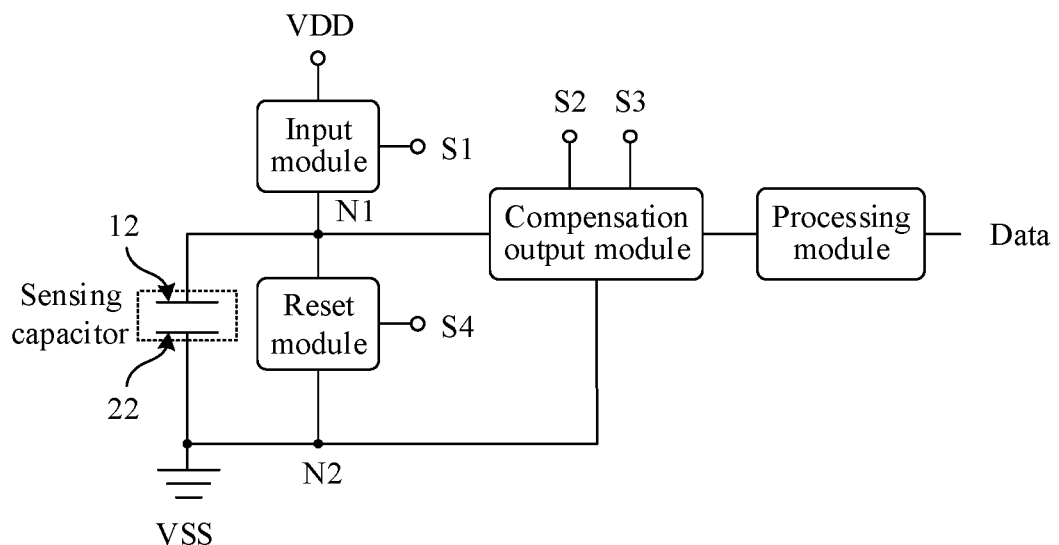
FIG. 9 is a schematic diagram of a structure of a detection circuit according to an exemplary embodiment of the present disclosure.

FIG. 9 is a schematic diagram of a structure of a detection circuit according to an exemplary embodiment of the present disclosure. In an exemplary embodiment, the detection circuit is connected to a first electrode (or a third electrode) in the first electrode structure and a second electrode (or a fourth electrode) in the second electrode structure, respectively, and is configured to detect a capacitance value of the sensing capacitor and obtain a bending angle of the foldable display device according to a capacitance change amount (or a capacitance value) of the sensing capacitor. As shown in FIG. 9, in an exemplary embodiment, the detection circuit may include an input module, a compensation output module, a reset module and a processing module.

In an exemplary embodiment, the input module is connected to a first power supply line VDD, a first signal line S1 and a first node N1, respectively. The first node N1 is connected to a first electrode 12 of the sensing capacitor. The input module is configured to output a high-level voltage signal of the first power supply line VDD to the first node N1 under control of the first signal line S1 to charge the sensing capacitor.

In an exemplary embodiment, the compensation output module is connected to a second signal line S2, a third signal line S3, a first node N1, a second node N2, and a processing module, respectively. The second node N2 is connected to a second electrode 22 of the sensing capacitor and a second power supply line VSS. The compensation output module is configured to compensate a base noise of the detection circuit under control of the second signal line S2, and output a voltage of the first node N1 to the processing module under control of the second signal line S2 and the third signal line S3.

In an exemplary embodiment, the reset module is connected to the second power supply line VSS, a fourth signal line S4, the first node N1, and the second node N2, respectively. The reset module is configured to output a voltage of the second node N2 to the first node N1 under control of the fourth signal line S4, to initialize the sensing capacitor and release charges of a capacitor plate of the sensing capacitor.

In an exemplary embodiment, the processing module is connected to the compensation output module, and is configured to receive and process a signal output by the compensation output module, and output a data signal (Data) proportional to a capacitance value of the sensing capacitor.

Figure 10:
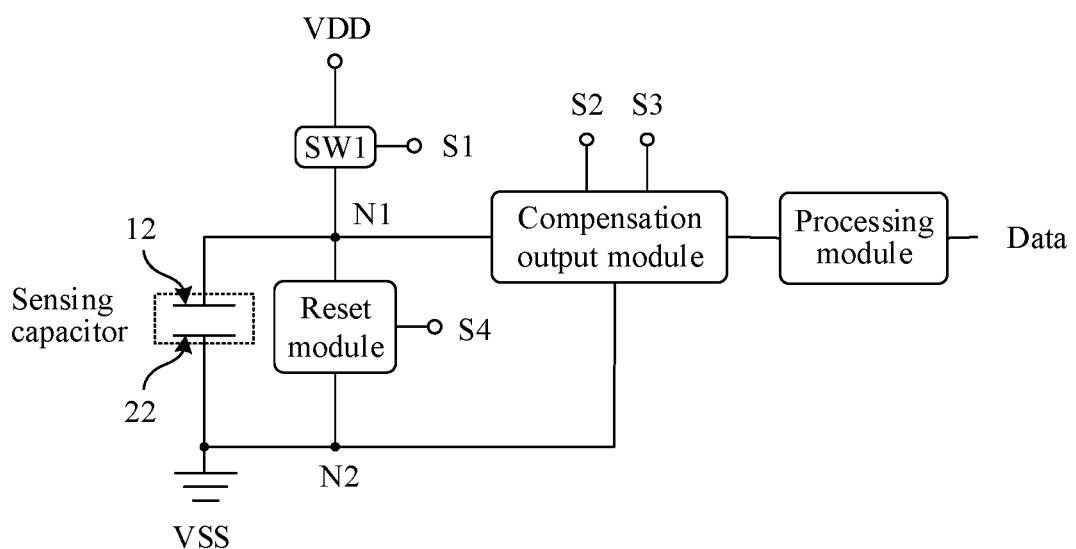
FIG. 10 is a schematic diagram of a structure of an input module according to an exemplary embodiment of the present disclosure.

FIG. 10 is a schematic diagram of a structure of an input module according to an exemplary embodiment of the present disclosure. As shown in FIG. 10, in an exemplary embodiment, the input module may include a first switch SW1. A control electrode of the first switch SW1 is connected to the first signal line S1, a first electrode of the first switch SW1 is connected to the first power supply line VDD, and a second electrode of the first switch SW1 is connected to a first node N1. When the first signal line S1 outputs a turn-off signal, the first switch SW1 is turned off, and when the first signal line S1 outputs a turn-on signal, the first switch SW1 is turned on, so that a high-level voltage signal of the first power supply line VDD is applied to the first node N1, and since the first node N1 is connected to the first electrode 12 of the sensing capacitor, charging of the sensing capacitor is realized.

Figure 11:
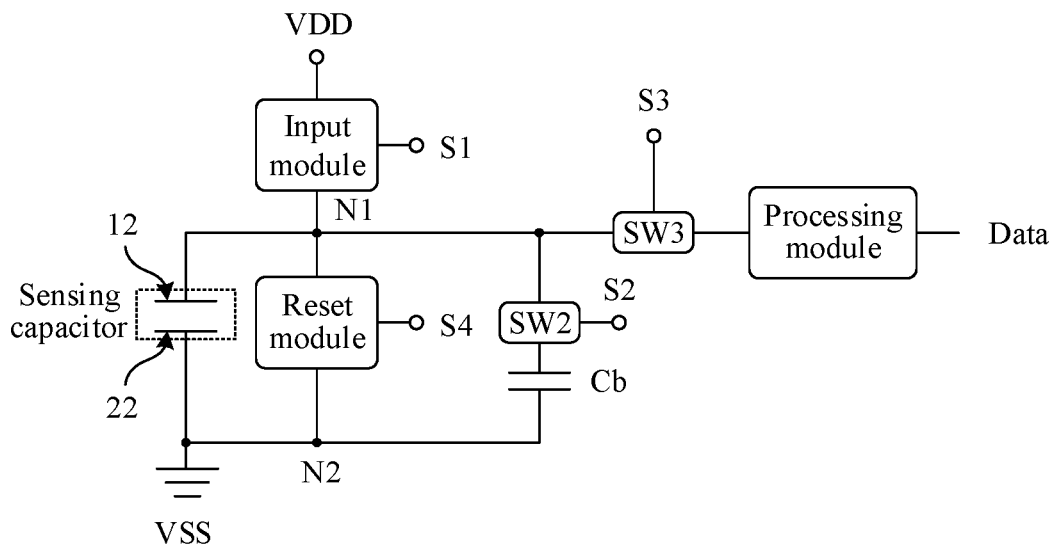
FIG. 11 is a schematic diagram of a structure of a compensation output module according to an exemplary embodiment of the present disclosure.

FIG. 11 is a schematic diagram of a structure of a compensation output module according to an exemplary embodiment of the present disclosure. As shown in FIG. 11, in an exemplary embodiment, the compensation output module may include a second switch SW2, a third switch SW3 and a compensation capacitor Cb. A control electrode of the second switch SW2 is connected to the second signal line S2, a first electrode of the second switch SW2 is connected to the first node N1, a second electrode of the second switch SW2 is connected to a first electrode plate of the compensation capacitor Cb, and a second electrode plate of the compensation capacitor Cb is connected to the second node N2. A control electrode of the third switch SW3 is connected to the third signal line S3, a first electrode of the third switch SW3 is connected to the first node N1, and a second electrode of the third switch SW3 is connected to the processing module. When the second signal line S2 outputs a turn-off signal, the second switch SW2 is turned off, and when the second signal line S2 outputs a turn-on signal, the second switch SW2 is turned on, so that the compensation capacitor Cb compensates a basic noise of the detection circuit. When the third signal line S3 outputs a turn-off signal, the third switch SW3 is turned off, and when the third signal line S3 outputs a turn-on signal, the third switch SW3 is turned on, so as to output a compensated voltage of the first node N1 to the processing module.

Figure 12:
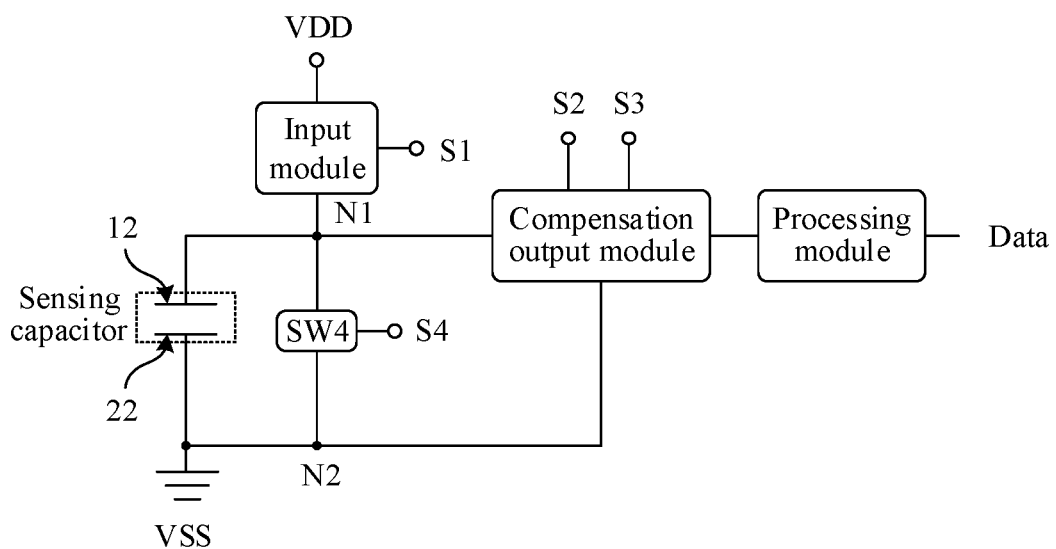
FIG. 12 is a schematic diagram of a structure of a reset module according to an exemplary embodiment of the present disclosure.

FIG. 12 is a schematic diagram of a structure of a reset module according to an exemplary embodiment of the present disclosure. As shown in FIG. 12, in an exemplary embodiment, the reset module may include a fourth Switch SW4. A control electrode of the fourth switch SW4 is connected to the fourth signal line S4, a first electrode of the fourth switch SW4 is connected to the second Node N2, and a second electrode of the fourth switch SW4 is connected to the first Node N1. When the fourth signal line S4 outputs a turn-off signal, the fourth switch SW4 is turned off, and when the fourth signal line S4 outputs a turn-on signal, the fourth switch SW4 is turned on, so that a voltage of the second node N2 is applied to the first node N1. Since the first node N1 is connected to the first electrode 12 of the sensing capacitor, and the second node N2 is connected to the second electrode 22 of the sensing capacitor and the second power supply line VSS, a low-level voltage signal of the second power supply line VSS is simultaneously applied to the first electrode 12 and the second electrode 22 of the sensing capacitor, thereby realizing initialization of the sensing capacitor and releasing the charges of the two capacitor plates of the sensing capacitor.

Figure 13:
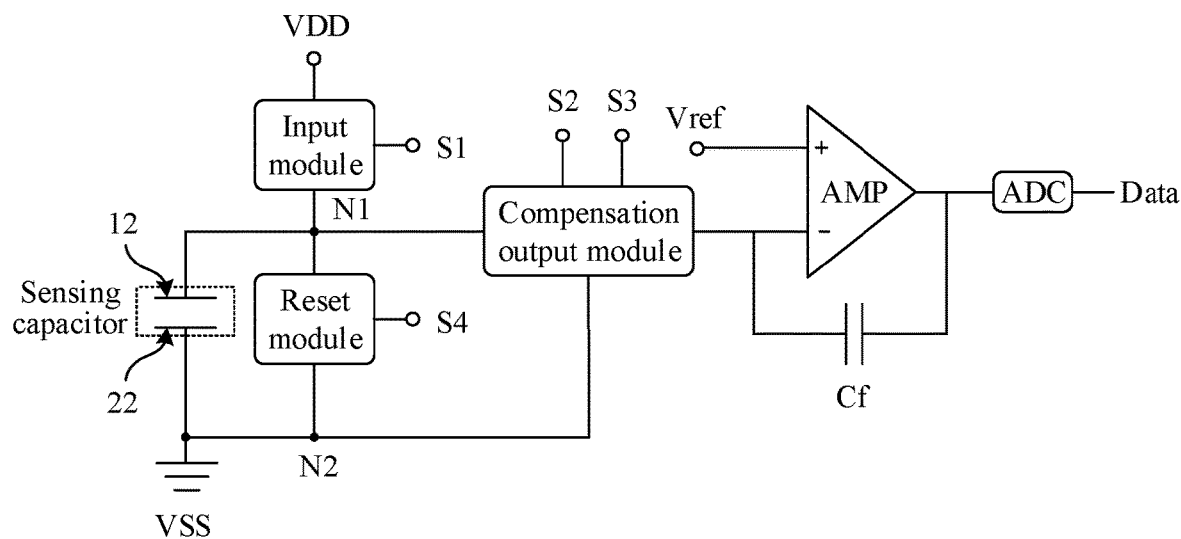
FIG. 13 is a schematic diagram of a structure of a processing module according to an exemplary embodiment of the present disclosure.

FIG. 13 is a schematic diagram of a structure of a processing module according to an exemplary embodiment of the present disclosure. As shown in FIG. 13, in an exemplary embodiment, the processing module may include an integrating amplifier (AMP), an analog-to-digital converter (ADC), and a feedback capacitor Cf. The feedback capacitor Cf is provided between a negative input terminal of the integrating amplifier and an output terminal of the integrating amplifier. A positive input terminal of the integrating amplifier is connected to a reference voltage line Vref, the negative input terminal of the integrating amplifier is connected to the compensation output module, the output terminal of the integrating amplifier is connected to an input terminal of the analog-to-digital converter, and an output terminal of the analog-to-digital converter outputs a data signal (Data) proportional to a capacitance value of the sensing capacitor.

Figure 14:
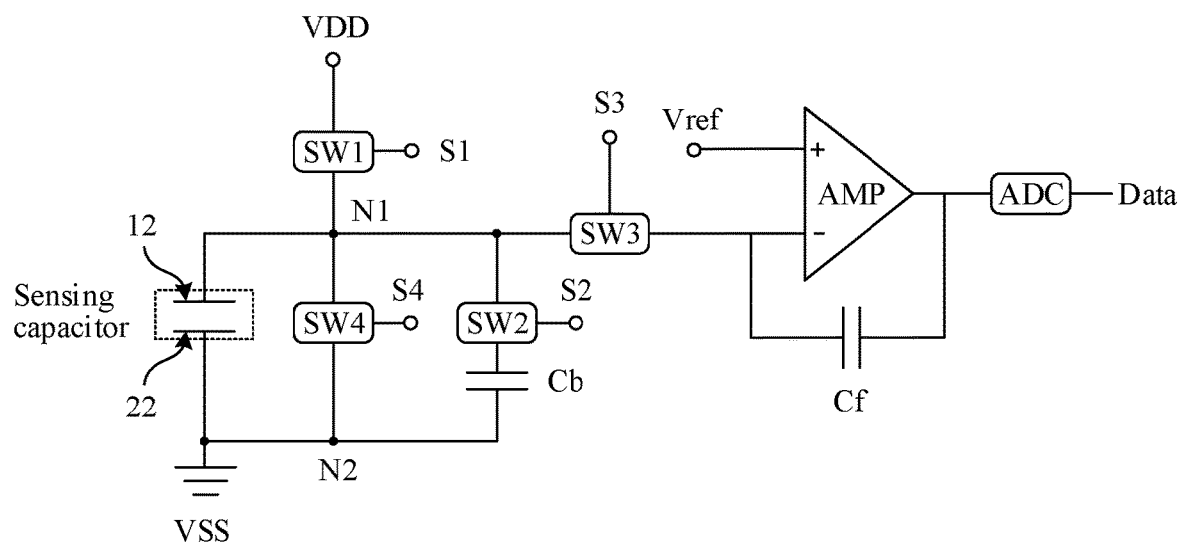
FIG. 14 is another schematic diagram of a structure of a detection circuit according to an exemplary embodiment of the present disclosure.

FIG. 14 is another schematic diagram of a structure of a detection circuit according to an exemplary embodiment of the present disclosure. As shown in FIG. 14, the detection circuit may include four switches (first switch SW1 to fourth switch SW4), two capacitors (compensation capacitor Cb and feedback capacitor Cf), an integrating amplifier AMP and an analog-to-digital converter ADC. The detection circuit is connected to seven signal lines (first signal line S1, second signal line S2, third signal line S3, fourth signal line S4, first power supply line VDD, second power supply line VSS and reference voltage line Vref), respectively.

In an exemplary embodiment, the detection circuit may include a first node N1 and a second node N2. The first node N1 is respectively connected to a first electrode 12 of the sensing capacitor, a second electrode of the first switch SW1, a first electrode of the second switch SW2, a first electrode of the third switch SW3 and a second electrode of the fourth switch SW4. The second node N2 is respectively connected to a second electrode 22 of the sensing capacitor, a second power supply line VSS, a first electrode of the fourth switch SW4 and a second plate of the feedback capacitor Cf.

In an exemplary embodiment, a control electrode of the first transistor SW1 is connected to the first signal line S1, a first electrode of the first switch SW1 is connected to the first power supply line VDD, and a second electrode of the first switch SW1 is connected to the first node N1. When a turn-on signal is applied to the first signal line S1, the first switch SW1 is turned on, and a high-level voltage signal of the first power supply line VDD is applied to the first node N1 to charge the sensing capacitor.

In an exemplary embodiment, a control electrode of the second switch SW2 is connected to the second signal line S2, a first electrode of the second switch SW2 is connected to the first node N1, a second electrode of the second switch SW2 is connected to the first electrode plate of the compensation capacitor Cb, and a second electrode plate of the compensation capacitor Cb is connected to the second node N2. When a turn-on signal is applied to the second signal line S2, the second switch SW2 is turned on, and the compensation capacitor Cb compensates a basic noise of the detection circuit.

In an exemplary embodiment, a control electrode of the third switch SW3 is connected to the third signal line S3, a first electrode of the third switch SW3 is connected to the first node N1, and a second electrode of the third switch SW3 is connected to a negative input terminal of the integrating amplifier. When a turn-on signal is applied to the third switch SW3, the third switch SW3 is turned on, and a compensated voltage of the first node N1 is output to the integrating amplifier AMP.

In an exemplary embodiment, a control electrode of the fourth switch SW4 is connected to the fourth signal line S4, a first electrode of the fourth switch SW4 is connected to the second node N2, and a second electrode of the fourth switch SW4 is connected to the first node N1. When a turn-on signal is applied to the fourth signal line S4, the fourth switch SW4 is turned on, and a voltage of the second node N2 is applied to the first node N1, to initialize the first electrode 12 and the second electrode 22 in the sensing capacitor.

In an exemplary embodiment, a positive input terminal of the integrating amplifier AMP is connected to a reference voltage line Vref, a negative input terminal of the integrating amplifier AMP is connected to the third switch SW3, an output terminal of the integrating amplifier AMP is connected to an input terminal of the analog-to-digital converter ADC, and a feedback capacitor Cf is provided between the negative input terminal and the output terminal of the integrating amplifier AMP.

In an exemplary embodiment, the input terminal of the analog-to-digital converter ADC is connected to the output terminal of the integrating amplifier AMP, and an output terminal of the analog-to-digital converter ADC outputs a data signal Data proportional to a capacitance value of the sensing capacitor.

In an exemplary embodiment, a signal of the first power supply line VDD is a high-level voltage signal provided continuously, a signal of the second power supply line VSS is a low-level voltage signal, and a signal of the reference voltage line Vref is a reference voltage signal provided continuously.

Figure 15:
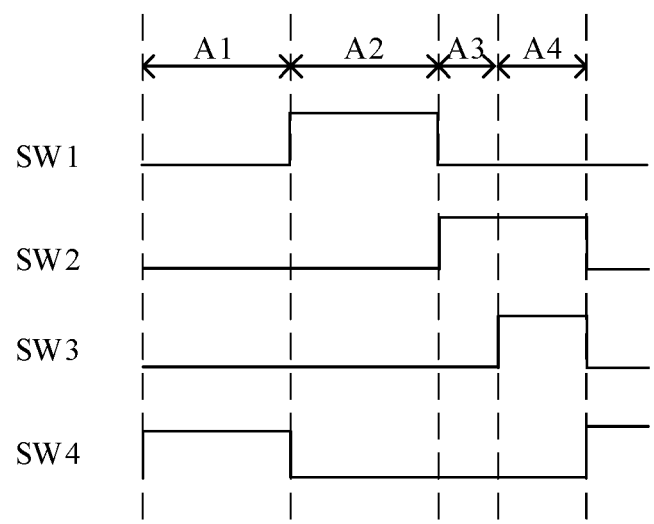
FIG. 15 is a working timing diagram of a detection circuit according to an exemplary embodiment of the present disclosure.

FIG. 15 is a working timing diagram of a detection circuit according to an exemplary embodiment of the present disclosure. In the following, a working process of the detection circuit illustrated in FIG. 14 is used to illustrate an exemplary embodiment of the present disclosure. In an exemplary embodiment, the working process of the detection circuit may include following stages.

In the first stage A1, referred to as a reset stage, the fourth signal line S4 outputs a turn-on signal to turn on the fourth switch SW4; the first signal line S1, the second signal line S2 and the third signal line S3 output a turn-off signal to turn off the first switch SW1, the second switch SW2 and the third switch SW3; and a low-level voltage signal output from the second power supply line VSS initializes the sensing capacitor to release charges of the first electrode 12 and the second electrode 22 in the sensing capacitor.

In the second stage A2, referred to as a charging stage, the first signal line S1 outputs a turn-on signal to turn on the first switch SW1; the second signal line S2, the third signal line S3 and the fourth signal line S4 output a turn-off signal to turn off the second switch SW2, the third switch SW3 and the fourth switch SW4; and a high-level voltage signal output by the first power supply line VDD charges the sensing capacitor.

In the third stage A3, referred to as a compensation stage, the second signal line S2 outputs a turn-on signal to turn on the second switch SW2; the first signal line S1, the third signal line S3 and the fourth signal line S4 output a turn-off signal to turn off the first switch SW1, the third switch SW3 and the fourth switch SW4; and the compensation capacitor Cb compensates a basic noise of the detection circuit to improve the accuracy of the output signal.

In the fourth stage A4, referred to as a sensing stage, the second signal line S2 and the third signal line S3 output a turn-on signal to turn on the second switch SW2 and the third switch SW3; the first signal line S1 and the fourth signal line S4 output a turn-off signal to turn off the first switch SW1 and the fourth switch SW4; and the processing module obtains and processes the compensated voltage of the first node N1 to output a data signal Data proportional to a capacitance value of the sensing capacitor.

According to the structure and working process of the foldable display device provided in the aforementioned embodiments of the present disclosure, by providing a capacitive sensor on the display panel, when the foldable display device is bent, the capacitive sensor is capable of changing a capacitance value with a bending angle, there is a one-to-one correspondence between a capacitance change amount (or capacitance value) of the capacitive sensor and the bending angle of the foldable display device, and the detection circuit is capable of obtaining the bending angle of the foldable display device by detecting the capacitance value or the capacitance change amount of the capacitive sensor, which has the advantages of simple structure, small volume, small working voltage/current, high accuracy in detecting the bending angle and the like, and may be applied to the bending angle detection of light and thin display devices.

An exemplary embodiment of the present disclosure further provides a method for driving a foldable display device, which is configured to drive the aforementioned foldable display device. In an exemplary embodiment, the method for driving a foldable display device may include the following acts:

S1, acquiring a folding angle of the foldable display device; and

S2, subjecting a folding area to color deviation correction according to the folding angle.

In an exemplary embodiment, act S1 may include the following acts:

S11, acquiring and storing an initial data signal output by a detection circuit when the foldable display device is in an unbent state;

S12, acquiring a bending data signal output by the detection circuit when the foldable display device is in a bent state; and S13, acquiring a bending angle of a display panel according to the initial data signal and the bending data signal.

In an exemplary embodiment, act S13 may include the following acts:

S131, calculating a difference value between the initial data signal and the bending data signal; and S132, obtaining a bending angle of the foldable display device according to the difference value and a preset bending angle coefficient.

In an exemplary embodiment, the bending angle coefficient is obtained by a calibration process and stored in advance in a timing controller (T-Con) or a source driver controller (Source Driver IC) in the foldable display device.

In an exemplary embodiment, the calibration process may include the following act:

S100, preparing the foldable display device.

In an exemplary embodiment, the foldable display device may include a display panel, a capacitive sensor provided on the display panel, and a detection circuit connected to the capacitive sensor. In an exemplary embodiment, the detection circuit may be individually provided, or may be integrated on the display substrate layer, or may be integrated in the T-Con or Source Driver IC, which is not limited in the present disclosure.

S200, placing the foldable display device in a completely flattened state (that is, the foldable display device is in an unbent state), and acquiring an initial data signal Data0 output by the detection circuit.

In an exemplary embodiment, the act of acquiring the initial data voltage Data0 output by the detection circuit may include: powering on the detection circuit, outputting a corresponding control signal according to the timing shown in FIG. 15, and outputting an initial data signal Data0 by the detection circuit through a reset stage, a charging stage, a compensation stage and a sensing stage, wherein the initial data signal Data0 is proportional to an initial capacitance value C0 of the sensing capacitor, that is, initial data signal Data0∝ initial capacitance value C0.

In an exemplary embodiment, since the foldable display device is in an unbent state, theoretically an overlapping length between the first electrode and the second electrode is a maximum value, the corresponding overlapping area S0=W1*L1, and the corresponding initial data signal Data0 is:

$$\text{Data0} = K \times C0 = K \times \frac{\varepsilon \times W1 \times L1}{4\pi kd}$$

where K is a proportional coefficient for the data signal and the capacitance value.

S300, placing the foldable display device in a fully folded state (i.e., the foldable display device is in a bent state and the bending angle θ is 180°), and acquiring a folding data voltage Data180 output by the detection circuit.

In an exemplary embodiment, the act of acquiring the folding data voltage Data180 output by the detection circuit may include: powering on the detection circuit after the display panel is folded, outputting a corresponding control signal according to the timing shown in FIG. 15, and outputting a folding data signal Data180 by the detection circuit through a reset stage, a charging stage, a compensation stage and a sensing stage, wherein the folding data signal Data180 is proportional to a folding capacitance value C180, that is, folding data signal Data180∝ folding capacitance value C180.

In an exemplary embodiment, since the foldable display device is in a bent state and the bending angle θ is 180°, theoretically an overlapping length between the first electrode and the second electrode is a minimum value, the corresponding overlapping area S180=W1*L3, and the corresponding folding data signal Data180 is:

$$\text{Data}180 = K \times C180 = K \times \frac{\varepsilon \times W1 \times L3}{4\pi k d}$$

S400, obtaining a bending angle coefficient according to the initial data signal and the folding data signal.

Since the moving distance ΔL of the first electrode relative to the second electrode is ΔL=π*(R2−R1), the bending angle coefficient A may be obtained by:

$$A = \text{Data}0 - \text{Data}180 = \\ K \times \frac{\varepsilon \times W1 \times (L1 - L3)}{4\pi k d} = K \times \frac{\varepsilon \times W1 \times \Delta L}{4\pi k d} = K \times \varepsilon \times W1 \times \frac{(R2-R1)}{4kd}$$

For the manufactured foldable display device, ε, k, d, R1, R2, W1 and K are all fixed values, so the bending angle coefficient A is constant.

When the foldable display device is in a bent state and the bending angle θ is greater than 0 and less than 180°, the moving distance ΔL of the first electrode relative to the second electrode is ΔLθ=π*(R2−R1)*θ/180, and the bending data voltage Dataθ output by the detection circuit is proportional to the bending capacitance value Cθ, that is, bending data voltage Dataθ∝bending capacitance value Cθ.

A difference ΔData between the initial data voltage Data0 and the bending data voltage Dataθ is proportional to a difference ΔC between the initial capacitance value C0 and the bending capacitance value Cθ, that is:

$$\text{Data}0 - \text{Data}\theta = \\ K \times \frac{\varepsilon \times W1 \times \Delta L\theta}{4\pi k d} = K \times \varepsilon \times W1 \times \frac{(R2-R1)}{4kd} \times \frac{\theta}{180} = \frac{A}{180} \times \theta$$

Thus, a corresponding relationship between the bending angle θ and the data change value ΔData is obtained. The difference ΔData between the initial data voltage Data0 and the bending data voltage Dataθ (proportional to the difference ΔC between the initial capacitance value C0 and the bending capacitance value Cθ) may be calculated according to the bending data voltage Dataθ detected in real time that is proportional to the bending capacitance value Cθ, and the bending angle θ of the foldable display device is obtained using the bending angle coefficient A.

In an exemplary embodiment, act S2 may include: subjecting the folding area to color deviation correction by the a T-Con, a Source Driver IC or an external circuit of the foldable display device according to the obtained folding angle θ, to adjust the color deviation of the bending area, thereby improving display quality and viewing experience, and further enhancing product competitiveness.

In an exemplary embodiment, the display panel of the present disclosure may be OLED, QLED, light emitting diode display (Micro LED or Mini LED) or quantum dot light emitting diode display (QDLED), etc. The foldable display device of the present disclosure may be any product or component with display function such as mobile phone, tablet computer, television, display, notebook computer, digital photo frame, navigator, etc, which is not limited in the present disclosure.

Although the implementations disclosed in the present disclosure are described as above, the described contents are only implementations which are used for facilitating the understanding of the present disclosure, and are not intended to limit the present invention. Any skilled person in the art to which the present disclosure pertains may make any modifications and variations in forms and details of implementation without departing from the spirit and scope of the present disclosure. However, the patent protection scope of the present invention should be subject to the scope defined by the appended claims.

The invention claimed is:

1. A foldable display device, comprising a display panel, at least one capacitive sensor and at least one detection circuit, wherein the display panel comprises at least one bending area configured for bending, the at least one capacitive sensor comprises a first electrode structure and a second electrode structure configured to form a sensing capacitor, and the detection circuit is connected to the first electrode structure and the second electrode structure, respectively, and is configured to detect a capacitance value of the sensing capacitor and acquire a bending angle of the foldable display device according to the capacitance value or a capacitance change amount of the sensing capacitor; wherein the first electrode structure comprises a first substrate and a first electrode, and the second electrode structure comprises a second substrate and a second electrode;

an overlapping area between the first electrode and the second electrode has a one-to-one corresponding relationship with the bending angle;

when the foldable display device is not bent, an orthographic projection of the first electrode on the second substrate is totally covered by an orthographic projection of the second electrode on the second substrate, the orthographic projection of the first electrode on the second substrate is greater than 0 and smaller than the orthographic projection of the second electrode on the second substrate, a side of the first electrode facing away from the first substrate faces a side of the second electrode facing away from the second substrate;

when the foldable display device is bent, the orthographic projection of the first electrode on the second substrate partially overlaps with the orthographic projection of the second electrode on the second substrate.

2. The foldable display device according to claim 1, wherein the display panel further comprises a first unfolded area and a second unfolded area provided on two sides of the bending area, respectively, the first electrode structure being connected to the first unfolded area, and the second electrode structure being connected to the second unfolded area.

3. The foldable display device according to claim 2, wherein the foldable display device comprises a reinforcing layer and a display structure layer provided on the reinforcing layer, wherein the display structure layer is provided with at least one mounting groove, the mounting groove at least comprises a groove bottom surface exposing the reinforcing layer, a first groove wall located in the first unfolded area and a second groove wall located in the second unfolded area, the at least one capacitive sensor is provided in the mounting groove, the first electrode structure is connected to the first groove wall and/or the groove bottom surface, and the second electrode structure is connected to the second groove wall and/or the groove bottom surface.

4. The foldable display device according to claim 3, wherein the first electrode structure comprises a first fixing structure connected to the first groove wall and/or the groove bottom surface of the mounting groove and the first electrode provided on a side of the first fixing structure close to the reinforcing layer; and the second electrode structure comprises a second fixing structure connected to the second groove wall and/or the groove bottom surface of the mounting groove and the second electrode provided on a side of the second fixing structure away from the reinforcing layer.

5. The foldable display device according to claim 4, wherein the first fixing structure comprises a first bottom frame and a first side frame, wherein the first bottom frame is in a strip shape extending in a first direction, the first side frame is in a strip shape extending in a second direction, the first side frame is connected to an end of the first bottom frame far away from the bending area, and the second direction intersects with the first direction; the first side frame is connected to the first groove wall and/or the groove bottom surface of the mounting groove, and the first electrode is provided on a side of the first bottom frame close to the reinforcing layer; the second fixing structure comprises a second bottom frame and a second side frame, wherein the second bottom frame is in a strip shape extending in the first direction, the second side frame is in a strip shape extending in the second direction, and the second side frame is connected to an end of the second bottom frame far away from the bending area; the second electrode is provided on a side of the second bottom frame far away from the reinforcing layer, the second side frame is connected to the second groove wall of the mounting groove, and/or the second bottom frame is connected to the groove bottom surface of the mounting groove.

6. The foldable display device according to claim 4, wherein the first fixing structure comprises a first side, a second side, a third side and a fourth side that are connected in turn and form an annular chamber, the first side and the third side extending in a first direction, the second side and the fourth side extending in a second direction, the second direction intersecting with the first direction; the third side is connected to the groove bottom surface of the mounting groove, and/or the fourth side is connected to the first groove wall of the mounting groove; the first electrode is provided on a side of the first side facing the reinforcing layer, and the second side is provided with at least one opening; the second fixing structure is a strip-shaped supporting layer extending in the first direction, which is connected to the groove bottom surface of the mounting groove, and/or connected to the second groove wall of the mounting groove; a first portion of the second electrode close to the first unfolded area extends through the opening into the annular chamber of the first fixing structure to enable that an orthographic projection of the first electrode on a plane of the foldable display device overlaps at least partially with an orthographic projection of the second electrode on a plane of the foldable display device; a second portion of the second electrode away from the first unfolded area is provided on a side of the strip-shaped support layer away from the reinforcing layer.

7. The foldable display device according to claim 6, wherein a side of the third side away from the reinforcing layer is provided with at least one support table configured to support the second electrode extending into the annular chamber.

8. The foldable display device according to claim 2, wherein the detection circuit comprises an input module, a compensation output module, a reset module, and a processing module; each of the input module, the compensation output module, and the reset module comprises a switch, and the processing module comprises an integrating amplifier, an analog-to-digital converter, and a feedback capacitor; wherein the input module is connected to a first power supply line, a first signal line and a first node respectively, wherein the first node is connected to a first electrode of the first electrode structure; the input module is configured to output a high-level voltage signal of the first power supply line to the first node under control of the first signal line to charge the sensing capacitor;

the compensation output module is connected to a second signal line, a third signal line, a first node, a second node and a processing module respectively, wherein the second node is connected to a second power supply line and a second electrode of the second electrode structure; the compensation output module is configured to compensate a base noise of the detection circuit under control of the second signal line, and outputs a voltage of the first node to the processing module under control of the second signal line and the third signal line;

the reset module is connected to a fourth signal line, the second power supply line, the first node and the second node respectively, and is configured to output a voltage of the second node to the first node under control of the fourth signal line to initialize and reset the sensing capacitor; and the processing module is connected to the compensation output module, and is configured to receive and process a signal output by the compensation output module, and output a data signal proportional to the capacitance value of the sensing capacitor.

9. The foldable display device according to claim 1, wherein the foldable display device further comprises a connector, a first housing and a second housing provided on two sides of the connector, respectively; the display panel further comprises a first unfolded area and a second unfolded area provided on two sides of the bending area, respectively, wherein the first unfolded area is connected to the first housing, the second unfolded area is connected to the second housing, and the first electrode structure and the second electrode structure are provided on the connector.

10. The foldable display device according to claim 9, wherein the connector comprises a rotating shaft, and a first connector, a second connector, the first electrode structure and the second electrode structure sheathed on the rotating shaft respectively; the first connector comprises a first cylinder sheathed on the rotating shaft and a first connecting piece provided on the first cylinder, the first connecting piece is connected to the first housing; the second connector comprises a second cylinder sheathed on the rotating shaft and a second connecting piece provided on the second cylinder, and the second connecting piece is connected to the second housing; the first electrode structure comprises a third cylinder sheathed on the rotating shaft and a third electrode provided on the third cylinder, the third cylinder is connected to the first cylinder; the second electrode structure comprises a fourth cylinder sheathed on the rotating shaft and a fourth electrode provided on the fourth cylinder, the fourth cylinder is connected to the second cylinder; and an orthographic projection of the third electrode on a plane perpendicular to the rotating shaft overlaps at least partially with an orthographic projection of the fourth electrode on a plane perpendicular to the rotating shaft.

11. The foldable display device according to claim 1, wherein the detection circuit comprises an input module, a compensation output module, a reset module, and a processing module; wherein each of the input module, the compensation output module, and the reset module comprises a switch, and the processing module comprises an integrating amplifier, an analog-to-digital converter, and a feedback capacitor; wherein
   the input module is connected to a first power supply line, a first signal line and a first node respectively, wherein the first node is connected to a first electrode of the first electrode structure; the input module is configured to output a high-level voltage signal of the first power supply line to the first node under control of the first signal line to charge the sensing capacitor;
   the compensation output module is connected to a second signal line, a third signal line, a first node, a second node and a processing module respectively, wherein the second node is connected to a second power supply line and a second electrode of the second electrode structure; the compensation output module is configured to compensate a base noise of the detection circuit under control of the second signal line, and outputs a voltage of the first node to the processing module under control of the second signal line and the third signal line;
   the reset module is connected to a fourth signal line, the second power supply line, the first node and the second node respectively, and is configured to output a voltage of the second node to the first node under control of the fourth signal line to initialize and reset the sensing capacitor; and
   the processing module is connected to the compensation output module, and is configured to receive and process a signal output by the compensation output module, and output a data signal proportional to the capacitance value of the sensing capacitor.

12. The foldable display device according to claim 11, wherein the input module comprises a first switch, wherein a control electrode of the first switch is connected to the first signal line, a first electrode of the first switch is connected to the first power supply line, and a second electrode of the first switch is connected to the first node.

13. The foldable display device according to claim 11, wherein the compensation output module comprises a second switch, a third switch and a compensation capacitor, wherein a control electrode of the second switch is connected to the second signal line, a first electrode of the second switch is connected to the first node, a second electrode of the second switch is connected to a first electrode plate of the compensation capacitor, a second electrode plate of the compensation capacitor is connected to the second node, a control electrode of the third switch is connected to the third signal line, a first electrode of the third switch is connected to the first node, and a second electrode of the third switch is connected to the processing module.

14. The foldable display device according to claim 11, wherein the reset module comprises a fourth switch, wherein a control electrode of the fourth switch is connected to the fourth signal line, a first electrode of the fourth switch is connected to the second node, and a second electrode of the fourth switch is connected to the first node.

15. The foldable display device according to claim 11, wherein the feedback capacitor is provided between a negative input terminal of the integrating amplifier and an output terminal of the integrating amplifier, a positive input terminal of the integrating amplifier is connected to a reference voltage line, the negative input terminal of the integrating amplifier is connected to the compensation output module, the output terminal of the integrating amplifier is connected to an input terminal of the analog-to-digital converter, and an output terminal of the analog-to-digital converter outputs a data signal proportional to the capacitance value of the sensing capacitor.

16. The foldable display device according to claim 11, wherein the input module comprises a first switch, the compensation output module comprises a second switch, a third switch, and a compensation capacitor, the reset module comprises a fourth switch;
   a control electrode of the first switch is connected to the first signal line, a first electrode of the first switch is connected to the first power supply line, and a second electrode of the first switch is connected to the first node;
   a control electrode of the second switch is connected to the second signal line, a first electrode of the second switch is connected to the first node, a second electrode of the second switch is connected to a first electrode plate of the compensation capacitor, and a second electrode plate of the compensation capacitor is connected to the second node;
   a control electrode of the third switch is connected to the third signal line, a first electrode of the third switch is connected to the first node, and a second electrode of the third switch is connected to the processing module;
   a control electrode of the fourth switch is connected to the fourth signal line, a first electrode of the fourth switch is connected to the second node, and a second electrode of the fourth switch is connected to the first node;
   the feedback capacitor is provided between a negative input terminal of the integrating amplifier and an output terminal of the integrating amplifier; and
   a positive input terminal of the integrating amplifier is connected to a reference voltage line, the negative input terminal of the integrating amplifier is connected to the compensation output module, the output terminal of the integrating amplifier is connected to an input terminal of the analog-to-digital converter, and an output terminal of the analog-to-digital converter outputs a data signal proportional to a capacitance value of the sensing capacitor.

17. A method for driving the foldable display device according to claim 1, comprising:
   acquiring the bending angle of the foldable display device using the at least one capacitive sensor; and
   subjecting the at least one bending area to color deviation correction according to the bending angle.

18. The method according to claim 17, wherein acquiring the bending angle of the foldable display device comprises:

acquiring and storing an initial data signal output by the detection circuit when the foldable display device is in an unbent state;

acquiring a bending data signal output by the detection circuit when the foldable display device is in a bent state; and acquiring the bending angle of the foldable display device according to the initial data signal and the bending data signal.

19. The method of according to claim 18, wherein acquiring the bending angle of the foldable display device according to the initial data signal and the bending data signal comprises:

calculating a difference value between the initial data signal and the bending data signal; and acquiring the bending angle of the foldable display device according to the difference value and a preset bending angle coefficient.

20. The method according to claim 19, wherein the bending angle coefficient is acquired by a calibration process, and the calibration process comprises:

preparing the foldable display device;

placing the foldable display device in a completely flattened state, and acquiring the initial data signal output by the detection circuit;

placing the foldable display device in a fully folded state, and acquiring the bending data signal output by the detection circuit; and acquiring the bending angle coefficient according to the initial data signal and the bending data signal.

* * * * *